(12) United States Patent
Deering

(10) Patent No.: US 6,525,725 B1
(45) Date of Patent: Feb. 25, 2003

(54) MORPHING DECOMPRESSION IN A GRAPHICS SYSTEM

(75) Inventor: Michael F. Deering, Los Altos, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/525,581

(22) Filed: Mar. 15, 2000

(51) Int. Cl.$^7$ .................................................. G06T 15/00
(52) U.S. Cl. ........................ 345/419; 345/619; 345/629; 345/646; 345/555; 345/582
(58) Field of Search ................................. 345/646, 419, 345/545, 619, 428, 538, 563, 581, 613, 629, 582, 639, 555

(56) References Cited

U.S. PATENT DOCUMENTS

| 5,481,669 A | | 1/1996 | Poulton et al. |
| 5,867,167 A | * | 2/1999 | Deering |
| 5,874,967 A | * | 2/1999 | West et al. |
| 6,005,582 A | * | 12/1999 | Gabriel et al. |
| 6,268,846 B1 | * | 7/2001 | Georgiev |
| 6,271,847 B1 | * | 8/2001 | Shum |
| 6,362,833 B2 | * | 3/2002 | Trika |

FOREIGN PATENT DOCUMENTS

EP           0 425 174 A2     10/1990

OTHER PUBLICATIONS

Michael Deering, "Geometry Compression", Computer Graphics Proceedings, Aug. 6, 1995, pp. 13–20.
Guttag K. et al. "A Single–Chip Multiprocessor for Multimedia: The MVP", IEEE Computer Graphics and Applications, vol. 12, No. 6, Nov. 1992, pp. 53–64.
Evans, O.D. et al. "Efficient Implementation of Image Warping on a Multimedia Processor", Real–Time Imaging, Dec. 1998, vol. 4, No. 6, pp. 417–428.
Hall, V., "Morphing in 2–D and 3–D", Dr. Dobb's Journal, Jul. 1993, vol. 18, No. 7, pp. 18–20, 22, 24, 26, 132, 92–93, XP001023722.
International Search Report, Application No. PCT/US 01/08338, mailed Oct. 15, 2001.

* cited by examiner

Primary Examiner—Mark Zimmerman
Assistant Examiner—Kimbinh T. Nguyen
(74) Attorney, Agent, or Firm—Jeffrey C. Hood

(57) ABSTRACT

A method and graphics system configured to perform real-time morphing of three-dimensional (3D) objects that have been compressed into one or more streams of 3D graphics data using geometry compression techniques. In one embodiment, the graphics system has one or more decompression units, each configured to receive and decompress the graphics data. The decompression units are configured to convey the decompressed data corresponding to the morphs to a graphics processor that is configured to apply weighting factors to the graphics data. The weighted results are combined to yield a morphed object that is rendered to generate one or more frames of a morphing sequence. The weighting factors may be adjusted and reapplied to yield additional frames for the morphing sequence. A method for encoding 3D graphics data to allow morphing decompression is also disclosed.

78 Claims, 11 Drawing Sheets

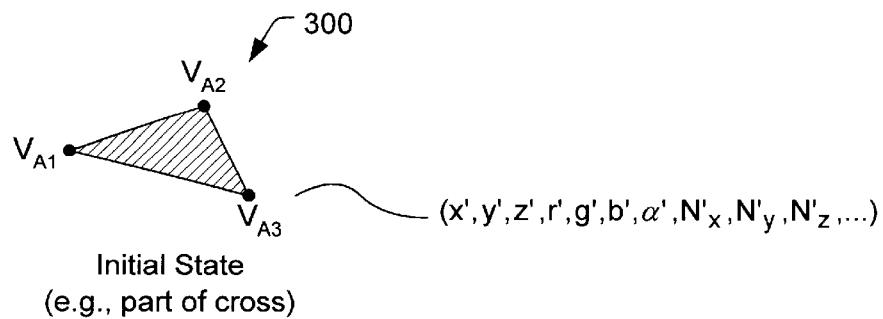
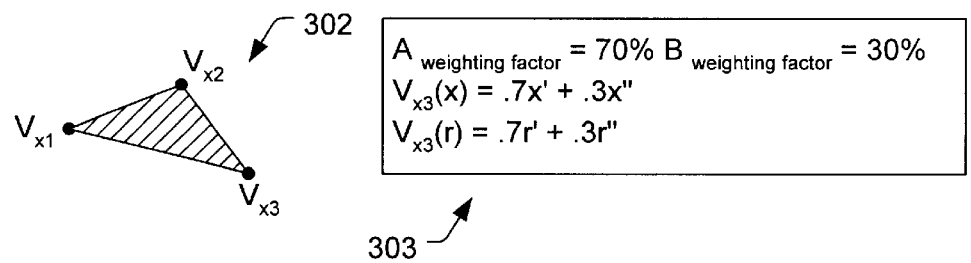
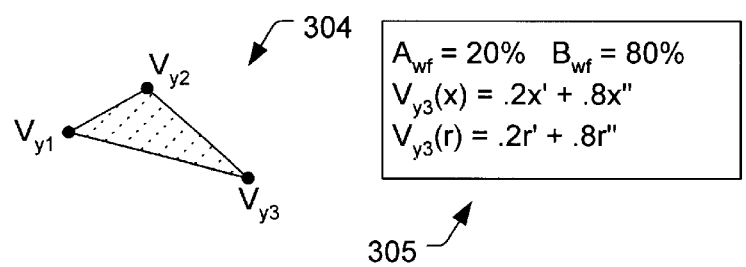
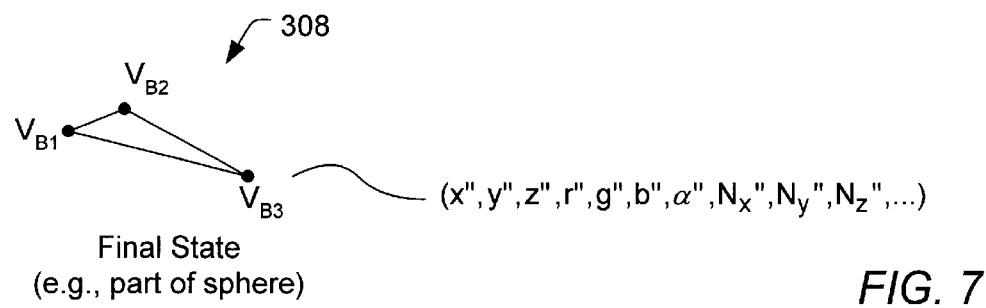
FIG. 7
$$V_{X1} = V_{A1}(x) \cdot wf_A + V_{B1}(x) \cdot wf_B + V_{C1}(x) \cdot wf_C + V_{D1}(x) \cdot wf_D$$
$$V_{X1}(\text{normalized}) = \frac{V_{A1}(x) \cdot wf_A + V_{B1}(x) \cdot wf_B + V_{C1}(x) \cdot wf_C + V_{D1}(x) \cdot wf_D}{wf_A + wf_B + wf_C + wf_D}$$
FIG. 8

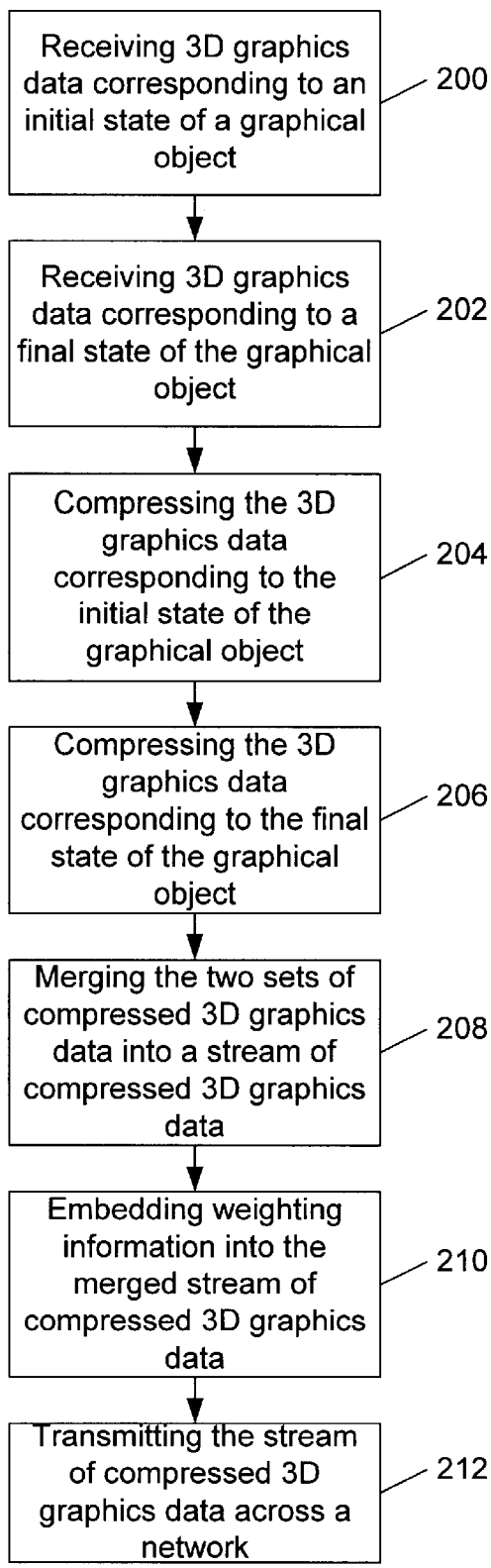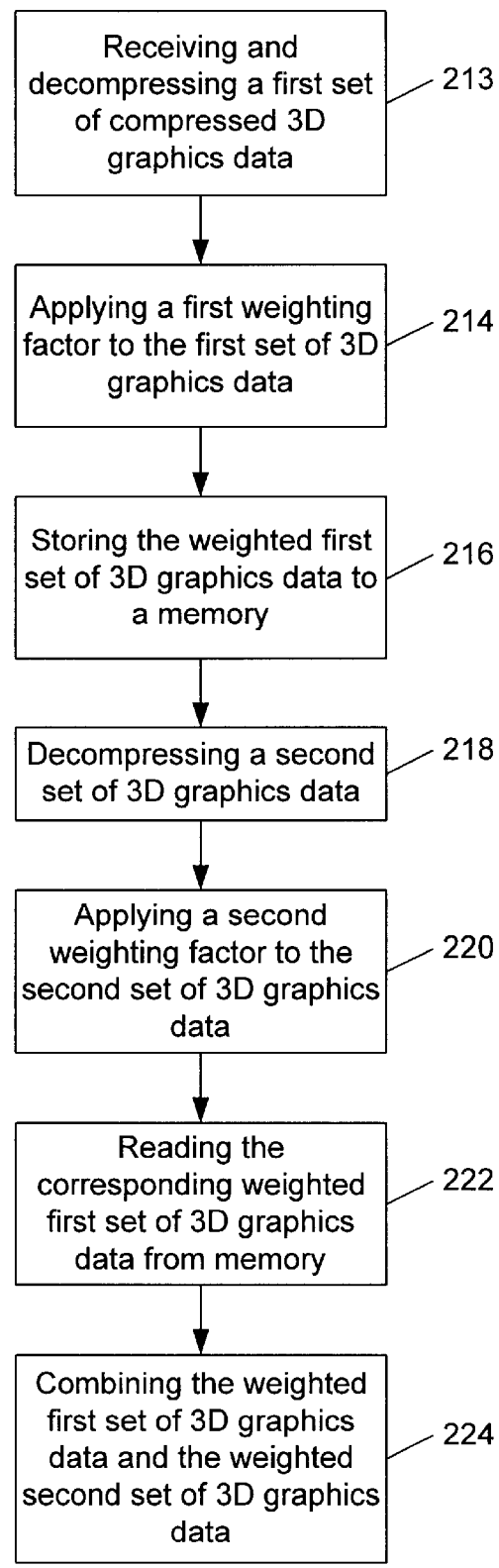
FIG. 13
FIG. 14

MORPHING DECOMPRESSION IN A GRAPHICS SYSTEM

BACKGROUND OF THE INVENTION

1. Field of the Invention

This invention relates generally to the field of computer graphics and, more particularly, to graphics systems that render images based on three-dimensional graphics data.

2. Description of the Related Art

A computer system typically relies upon its graphics system for producing visual output on a computer screen or display device. Early graphics systems were only responsible for taking what the processor produced as output and displaying it on the screen. In essence, they acted as simple translators or interfaces. Modem graphics systems, however, incorporate graphics processors with a great deal of processing power. These new graphics systems act more like coprocessors rather than simple translators. This change is due to the recent increase in both the complexity and the amount of data being sent to the display device. For example, modern computer displays have many more pixels, greater color depth, and are able to display images with higher refresh rates than earlier models. Similarly, the images displayed are now more complex and may involve advanced rendering techniques such as anti-aliasing and texture mapping.

As a result, without considerable processing power in the graphics system, the computer system's CPU would spend a great deal of time performing graphics calculations. This could rob the computer system of the processing power needed for performing other tasks associated with program execution, and thereby dramatically reduce overall system performance. With a powerful graphics system, however, when an application draws a box on the screen, the CPU is freed from having to compute the position and color of each pixel. Instead, the CPU may send a request to the video card stating "draw a box at these coordinates." The graphics system then draws the box, thereby freeing the CPU to perform other tasks.

Since graphics systems typically perform only a limited set of functions, they may be customized and therefore may be far more efficient at graphics operations than the computer's general-purpose microprocessor. While early graphics systems were limited to performing two-dimensional (2D) graphics, their functionality has increased to support three-dimensional (3D) wire-frame graphics, 3D solids, and now may include support for textures and special effects such as programmable shading, fogging, alpha-blending, and specular highlighting.

The rendering ability of 3D graphics systems has been improving at a breakneck pace. A few years ago, shaded images of simple objects could only be rendered at a few frames per second, but today's systems support the rendering of complex objects at 60 Hz or higher. At this rate of increase, in the not too distant future graphics systems will literally be able to render more pixels in realtime than a single human's visual system can perceive. While this extra performance may be useable in multiple-display environments, it may be wasted in the more common single-display environments. Thus, a graphics system is desired which is capable of utilizing the increased graphics processing power to generate more visually appealing images.

While the number of pixels and frame rate is important in determining graphics system performance, another factor of equal or greater importance is the visual quality of the image generated. One factor that can dramatically improve the perceived quality of an image is the real-time application of certain graphics effects. For example, the ability to anti-alias an image in real-time may dramatically increase the perceived quality of images rendered by a graphics system. Anti-aliasing is a technique for diminishing jagged edges in an image that should be smooth. The jagged edges (sometimes called "stair-steps" or "jaggies") typically occur because the display device does not have a high enough resolution to represent the edge in a smooth manner. Anti-aliasing reduces the prominence of the jagged edges by surrounding the stair-steps with intermediate shades of color.

Another type of graphics effect that has seen a recent increase in popularity is morphing. The term "morphing" is derived from the word "metamorphosis" and refers generally to an animation technique in which an image of a first object is gradually transformed into an image of a second object. A number of different morphing techniques have been in use for morphing two-dimensional (2D) images (sometimes referred to as "image morphing"). In image morphing, a sequence of images is created that depicts a gradual transition between two images. While these techniques are now well known in image manipulation software, these 2D techniques suffer from a number of drawbacks. These drawbacks include the inability to correctly handle changes in illumination (e.g., shadows) and the inability to properly incorporate features of an object that are not visible in the original 2D image. For example, when a roaring lion opens its mouth during the morph, pulling its lips apart may thicken the lips instead of moving the lips to reveal the lion's teeth.

Fortunately, there is an alternative to image morphing called "3D morphing" or "volume morphing". This technique is useful for images generated from 3D models as opposed to 2D images. In 3D morphing, a number of intermediate 3D models (called "morphs") are created directly from the given starting and ending models. Thus, instead of forming intermediate images by interpolating between two 2D images, 3D morphing creates intermediate models (i.e., "morphs") that are rendered. These morphs may then be rendered using traditional rendering techniques to produce an image sequence depicting the transformation. Since 3D morphing is based on 3D models instead of 2D images, it overcomes the aforementioned shortcomings of image morphing.

Unfortunately, 3D morphing has its own set of drawbacks that may reduce its utility, particularly in real-time 3D computer graphics systems. One major drawback is data bandwidth. To generate realistic or visually appealing scenes, elaborate 3D models are typically employed. For example, a realistic 3D model of a single car may include more than 20,000 graphics primitives (e.g., polygons). Each primitive may have elaborate color, texture map, transparency, and other information associated with it. Thus the bandwidth requirements for transmitting, processing, and rendering the 3D models in real time may be prohibitive.

These obstacles have prevented graphics systems from providing effective support for 3D morphing in a real-time manner (in contrast with offline software solutions). Real-time morphing is desirable because in many applications (e.g., 3D computer games), the viewpoint or camera location may not be known when the game is being compiled. Furthermore, the viewpoint or camera location may change in a dynamic fashion during the morphing sequence. Without the ability to do real-time morphing, the game may be forced to "lock-in" the viewpoint during the morphing sequence, which could adversely affect the game's look-and-feel or "playability". Predetermining the viewpoint also limits the applicability of morphing in other real-time applications such as virtual reality environments.

For at least these reasons, a graphics system capable of performing morphing on 3D graphics data is desired. In addition, a graphics system capable of performing morphing in a real-time fashion is desired. Furthermore, a method for encoding 3D graphics data to allow morphing is also desired.

SUMMARY OF THE INVENTION

The present invention contemplates the use of 3D geometry compression in connection with embedded weighting information to allow 3D morphing. In some embodiments, the 3D morphing may be implemented as part of the decompression process. In some embodiments, this configuration may have the potential to allow 3D morphing in real-time.

Definitions

As used in this application, the following terms should be broadly construed according to the following definitions:

"Real-time" means without a delay that dramatically and adversely impacts the user experience of an interactive application (such as a 3D game). For example, processes performed on a per-frame basis that match a display device's refresh cycle are considered to be real-time. Furthermore, processes that have small latencies that are not particularly noticeable by the average application users are also considered to be real-time. In contrast, "off-line" processes are those that are performed before application execution. An example would be a batch process for rendering frames of 3D movie, wherein each frame requires an hour of processing time to render.

A "frame" means a single image, e.g., one image of sequence of images that forms a movie or video clip. A frame may be displayed on a display device for one or more refresh cycles. A frame may also be used to refer to the information used to refresh the image on a display device.

A "geometric primitive" is a type of three-dimensional graphics data and is typically viewed as a basic unit or building block that, when used in combination, can form graphical objects. Examples of geometric primitives include: points (dots), lines, vectors, vertices, triangles, polygons, Non-Uniform Rational B-Splines (NURBs), sub-division surfaces, fractals, parametric surfaces, control surfaces, and volume primitives, splines, and particle systems.

A "graphical object" (or "object") is a grouping of three-dimensional graphics data. Typically, but not always, the grouping reflects either an entire real world object or three-dimensional shape, or a portion thereof (e.g., a car may be an object, a car wheel may be an object, or a toroid that forms a car tire may be an object). However, an object may also be a single geometric primitive or a set of randomly assembled geometric primitives.

"Three-dimensional graphics data" (or "3D graphics data") is a broad term that means data that is used to approximate or represent three-dimensional objects or information in a three-dimensional manner. For example 3D graphics data may include points (dots), lines, vectors, vertices, triangles, polygons, Non-Uniform Rational B-Splines (NURBs), sub-division surfaces, control surfaces, volume elements, normals, geometric primitives, texture mapping information, surface characteristics (e.g., bump mapping information), transparency information, reflectivity information, position and orientation information, environmental information (e.g., fogging), color information, and lighting information.

An "initial state", as used herein, refers to a first or starting set of information for a graphical object being morphed. For example, the initial state may include one or more of the following types of information: a particular position, orientation, scale, color, shape, size, level of detail, transparency, texture, surface characteristic, environmental information, lighting information, sets of geometric primitives, and other three-dimensional graphics data.

An "intermediate state" refers to one or more sets of information that are usable to guide the morphing process from the initial state to the final state. For example, an intermediate state may provide shape information about the graphical object being morphed that corresponds to the shape of the object when it is halfway through the morphing sequence.

A "final state", as used herein, refers to a "destination" set of information that substantially defines (either alone or in combination with other information, e.g., in combination with previous states) the final shape, position, etc., of the graphical object being morphed with respect to the morphing process.

A "stream" of data refers to a sequence of 3D graphics data that may include data for one or more states of one or more graphical objects. A "sub-stream" of data refers to a subset of the 3D graphics data in a steam, wherein the subset corresponds to a single state.

A "weighting factor" refers to information that is usable to determine how much a particular set of graphics data corresponding to a particular state of a graphical object should contribute to a particular frame of morphed output.

BRIEF DESCRIPTION OF THE DRAWINGS

The foregoing, as well as other objects, features, and advantages of this invention may be more completely understood by reference to the following detailed description when read together with the accompanying drawings in which:

FIG. 7 is a diagram illustrating one embodiment of a method for 3D morphing.

FIG. 8 is a diagram illustrating one embodiment of equations that may be used in 3D morphing.

FIG. 13 is a flowchart of one embodiment of a method for compressing 3D graphics data into a data stream in a format suitable for real-time 3D morphing upon decompression.

FIG. 14 is a flowchart of one embodiment of a method for decompressing 3D graphics data and performing real-time 3D morphing.

Figure 1C:
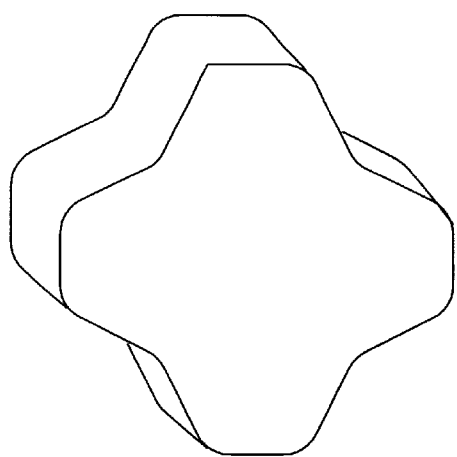
FIGS. 1A–F show a sequence of frames illustrating an example of a cross morphing into a sphere.
Figure 1F:
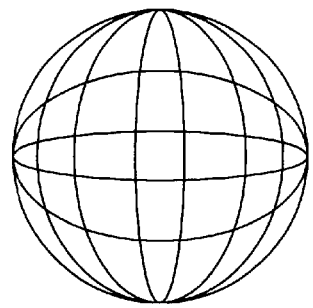
Figure 1B:
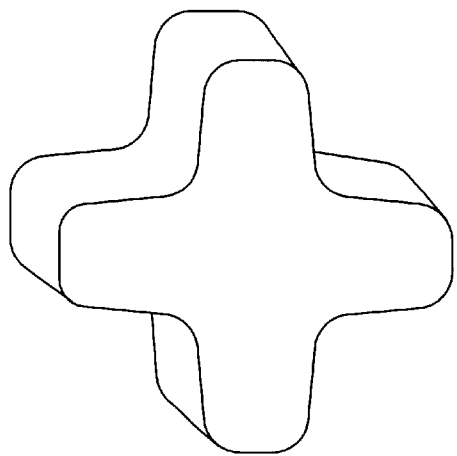
Figure 1E:
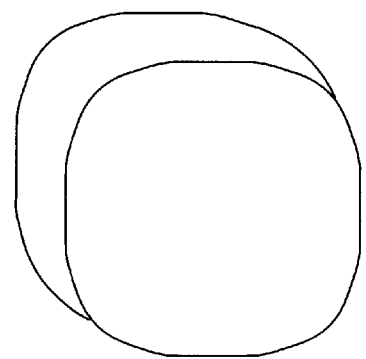
Figure 1A:
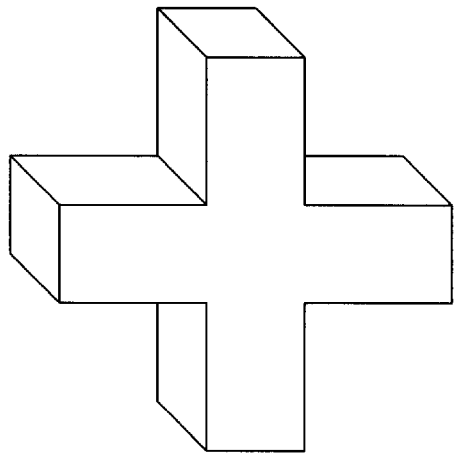
Figure 1D:
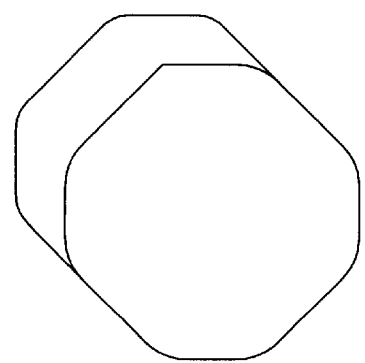

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Please note that the headings are for organizational purposes only and are not intended to limit the scope of the description or claims.

DETAILED DESCRIPTION OF SEVERAL EMBODIMENTS

Figure 2:
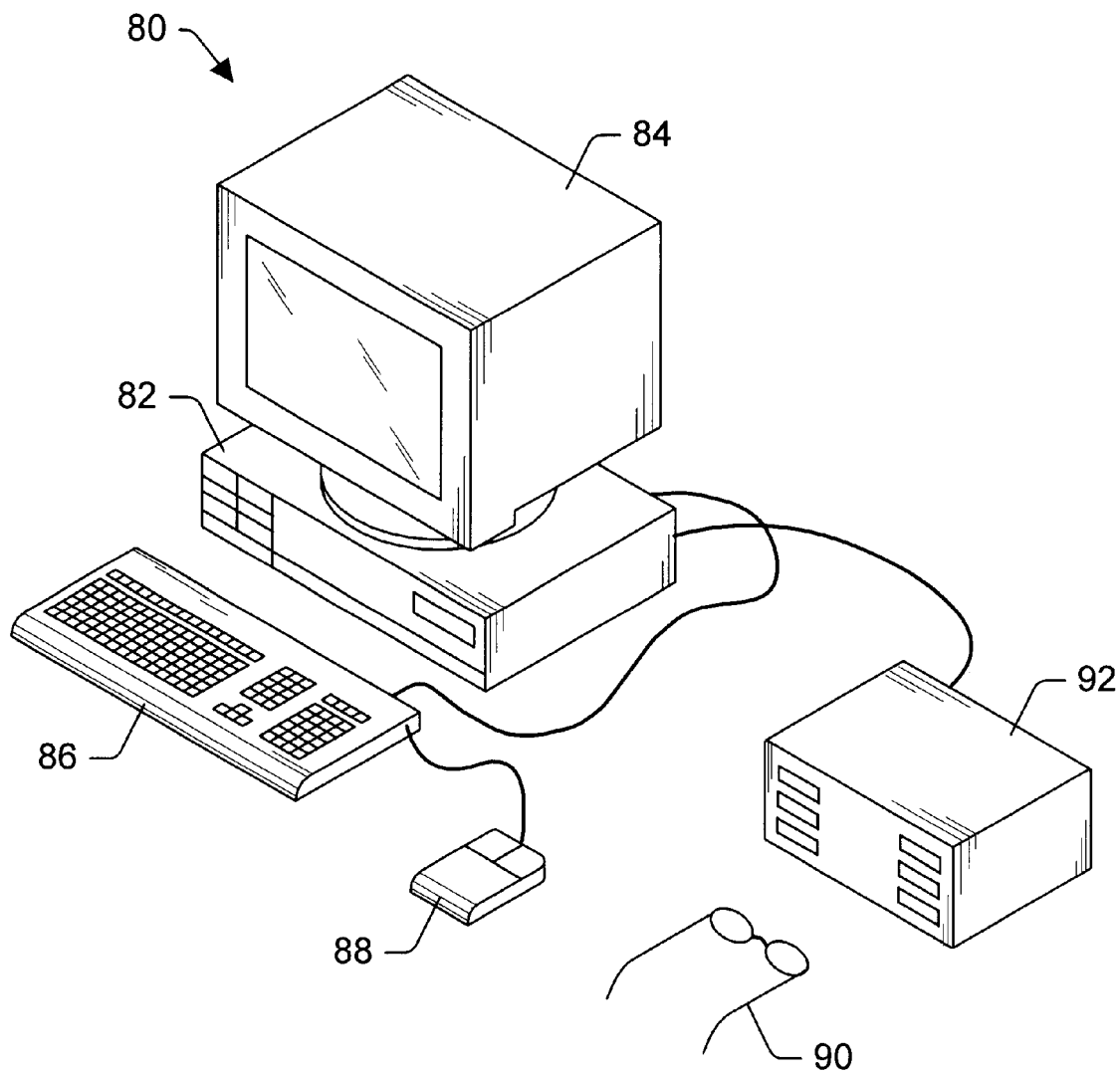
FIG. 2 illustrates one embodiment of a computer system.

FIG. 2—Computer System

Referring now to FIG. 2, one embodiment of a computer system 80 that includes a three-dimensional (3D) graphics system is shown. Computer system 80 comprises a system unit 82 and a display device 84 coupled to the system unit 82. Display device 84 may be any of various types of display monitors or devices, e.g., a CRT, LCD, DLP, gas-plasma, projection or other type of display. Various input devices may be connected to the computer system, including a keyboard 86 and/or a mouse 88, or other input device (e.g., a trackball, digitizer, tablet, six-degree of freedom input device, head tracker, eye tracker, data glove, body sensors, etc.). Application software may be executed by the computer system 80 to display 3D graphical objects on display device 84. As described further below, the 3D graphics system in computer system 80 includes a super-sampled sample buffer with a programmable real-time sample-to-pixel calculation unit to improve the quality and realism of images displayed on display device 84.

Other embodiments of computer system 80 are also possible and contemplated. For example, computer system 80 may be implemented as a set-top box or gaming console configured to coupled to a television, a personal digital assistant (PDA), a laptop computer, or other digital appliance.

Figure 3:
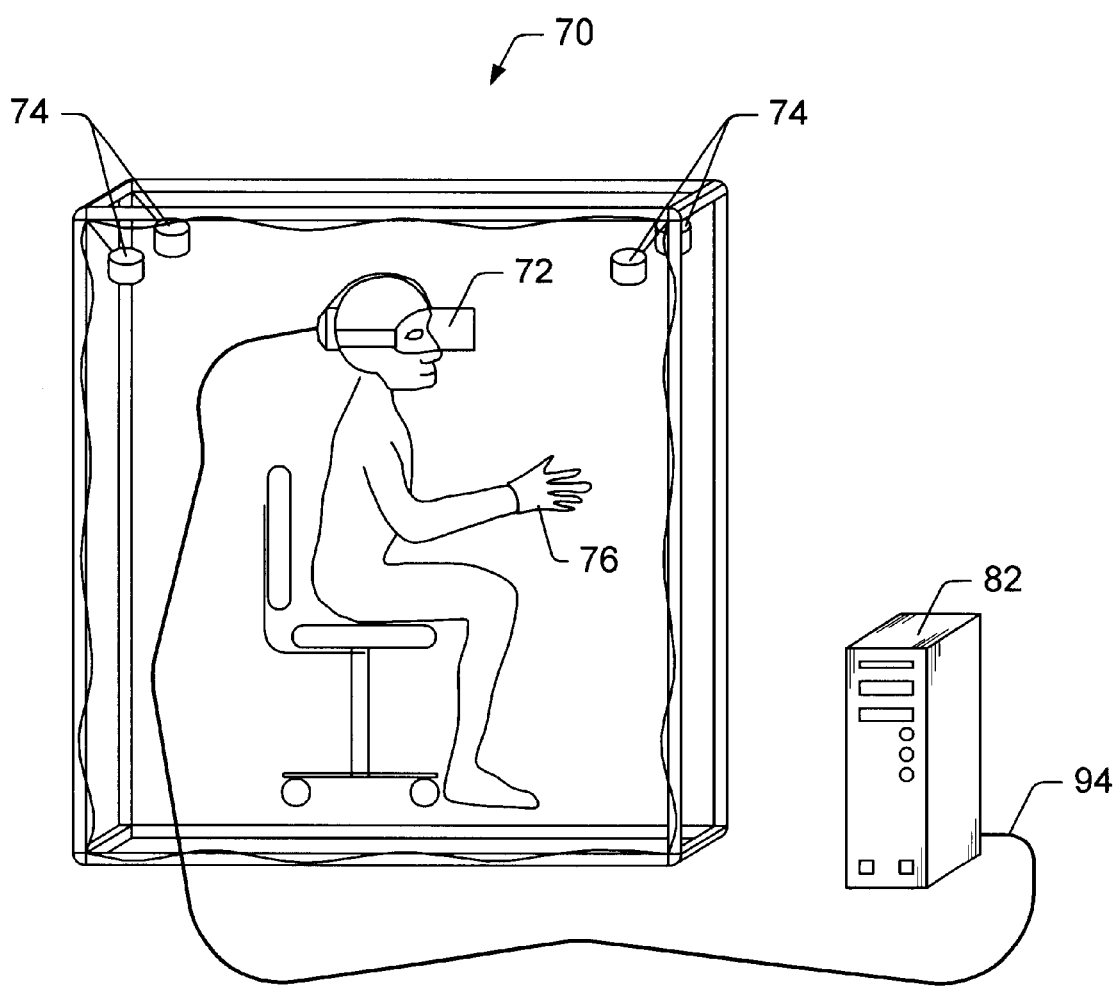
FIG. 3 illustrates another embodiment of a computer system that is part of virtual reality workstation.

FIG. 3—Virtual Reality Workstation

FIG. 3 illustrates another embodiment of a computer system 70 that serves as a virtual reality workstation. In this embodiment, system 70 comprises a head-mounted display device 72, head-tracking sensors 74, and a data glove 76. Head mounted display 72 may be coupled to system unit 82 via a fiber optic link 94, or one or more of the following: an electrically-conductive link, an infra-red link, or a wireless (e.g., RF) link. In this embodiment, system unit 82 may be configured with or without a storage array. In embodiments without a storage array, system unit 82 receives compressed 3D graphics data via broadcast, internet link, or satellite link (e.g., at a rate of 42 megabytes per second). Other embodiments are possible and contemplated (e.g., computer systems completely contained within visor 72).

Figure 4:
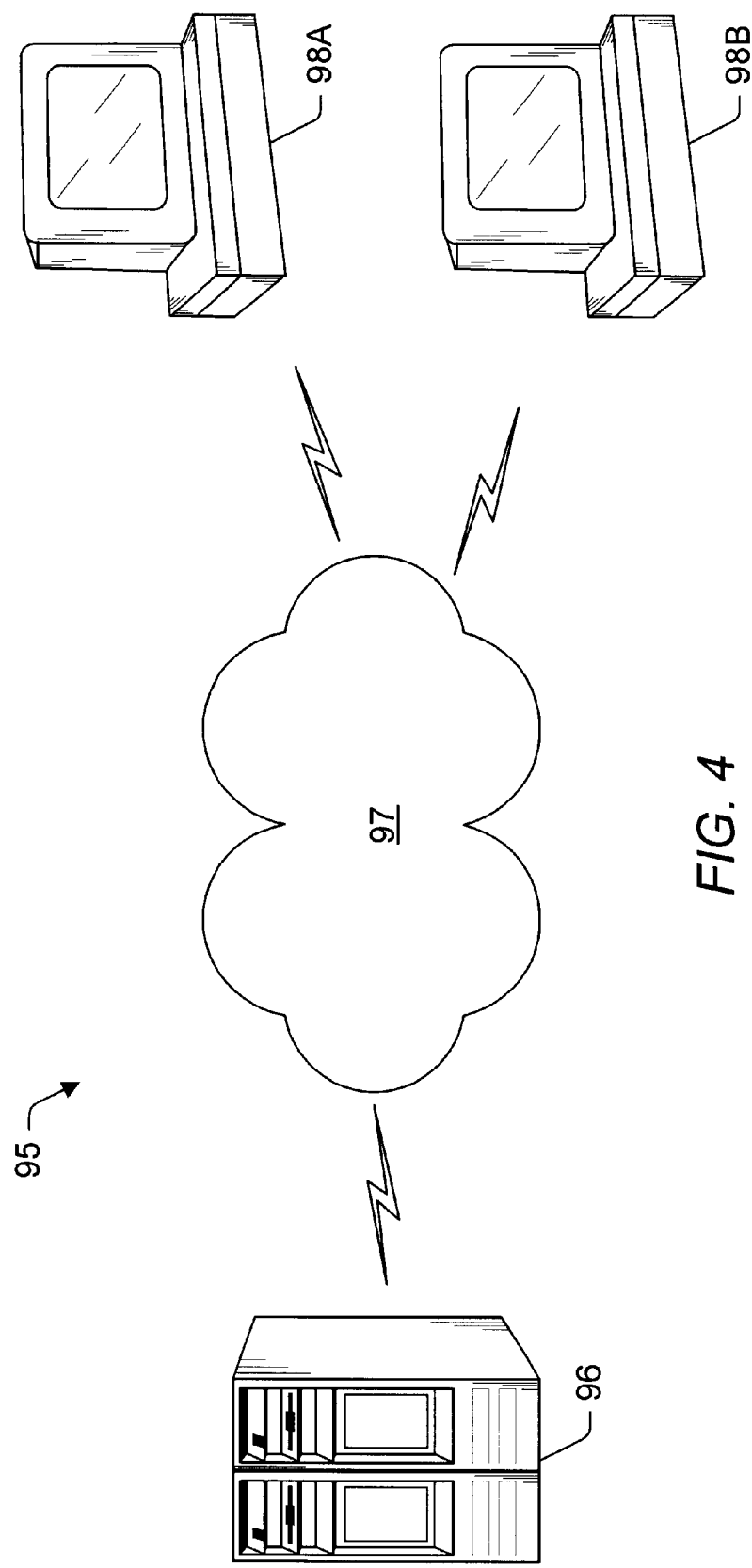
FIG. 4 illustrates one embodiment of a computer network.

FIG. 4—Computer Network

Referring now to FIG. 4, a computer network 95 is shown comprising at least one server computer 96 and one or more client computers 98A–B. One or more of client systems 98A–B may be configured similarly to computer systems 70 or 80, with each having one or more graphics systems. Server 96 and client(s) 98A–B may be joined through a variety of connections 97, such as a local-area network (LAN), a wide-area network (WAN), or an Internet or wireless Internet connection. In one embodiment, server 96 may store and transmit 3D graphics data (which may be compressed) to one or more of clients 98A–B. Clients 98A–B receive the compressed 3D graphics data, decompress it (if necessary) and then render the graphics data. The rendered image is then displayed on the client's display device. The clients may morph the compressed 3D graphics data as described in greater detail below. The morphing may be accomplished in real-time or near-real-time, or in an off-line manner. In some embodiments, the compressed 3D graphics data may be transferred between client computers 98.

Figure 5:
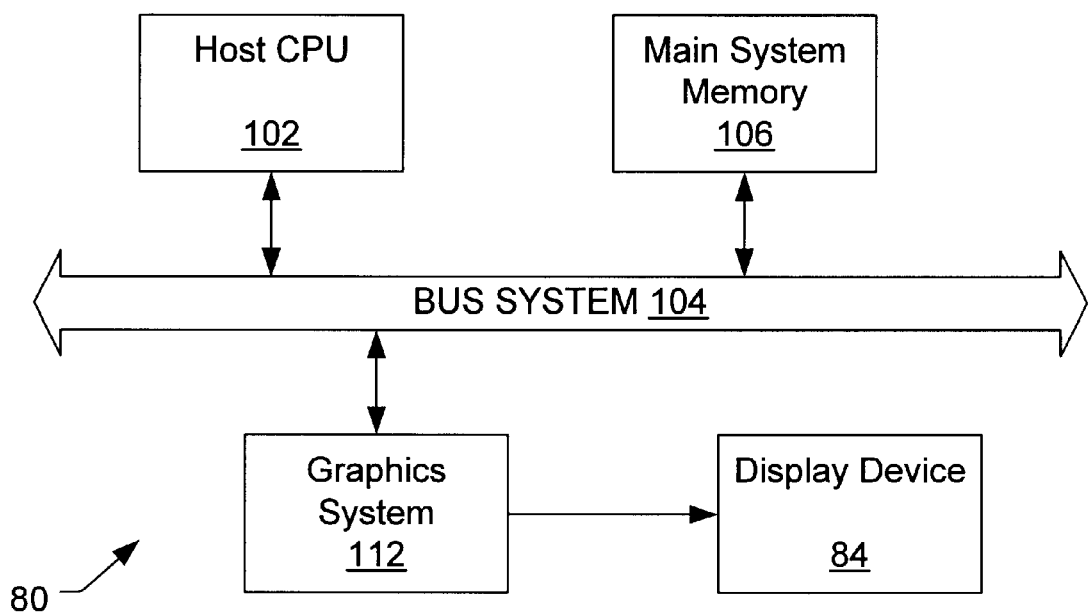
FIG. 5 is a simplified block diagram of one embodiment of the computer system of FIG. 5.

FIG. 5—Computer System Block Diagram

Referring now to FIG. 5, a simplified block diagram illustrating one embodiment of computer system 80 is shown. Elements of the computer system that are not necessary for an understanding of the present invention are not shown for convenience. As shown, the computer system 80 includes a central processing unit (CPU) 102 coupled to a bus system 104, which may include one or more different buses, e.g., a host bus, a high speed memory bus, peripheral buses, and other types of buses. A main system memory 106 may also be coupled to high-speed bus 104. Host processor 102 may comprise one or more processors of varying types, e.g., microprocessors, multi-processors and CPUs. The system memory 106 may comprise any combination of different types of memory subsystems, including random access memories, (e.g., static random access memories or "SRAMs", synchronous dynamic random access memories or "SDRAMs", and Rambus dynamic access memories or "RDRAM", among others) and mass storage devices. The system bus or host bus 104 may comprise one or more communication or host computer buses (for communication between host processors, CPUs, and memory subsystems) as well as specialized subsystem buses.

A graphics system 112 according to the present invention is coupled to bus 104. The graphics system 112 may be coupled to bus 104 by a crossbar switch or other bus connectivity logic (e.g., transceivers, buffers, latches, etc.). It is assumed that various other peripheral devices, or other buses, may be connected to bus 104. It is noted that graphics system 112 may be coupled to one or more buses in bus system 104 and in computer system 80 in general. In addition, graphics system 112 may be coupled to a communication port and thereby receive graphics data directly from an external source, e.g., the Internet or another type network. As shown in the figure, display device 84 is connected to graphics system 112.

Host CPU 102 may transfer information to and from graphics system 112 according to a programmed input/output (I/O) protocol over bus system 104. Alternately, graphics system 112 may access the memory subsystem 106 according to a direct memory access (DMA) protocol or through intelligent bus mastering. In another embodiment, the graphics system 112 may be coupled to the system memory 106 through a direct port, such as the Advanced Graphics Port (AGP) promulgated by Intel Corporation.

A graphics application program conforming to an application programming interface (API) such as OpenGL™ or Java 3D™ may execute on host CPU 102 and generate commands and data that define geometric primitives (e.g., polygons) for output on display device 84. As defined by the particular graphics interface used, these primitives may have separate color properties for the front and back surfaces.

Host processor 102 may transfer 3D graphics data to memory subsystem 106. Thereafter, the host processor 102 may operate to transfer the graphics data to the graphics system 112 over bus system 104. In another embodiment, graphics system 112 may read in graphics data arrays over bus system 104 using DMA access cycles.

Graphics system 112 may receive graphics data from any of various sources, including host CPU 102 and/or the system memory 106, other memory, or from an external source such as a network (e.g., the Internet), a broadcast medium (e.g., television), from a hard drive, CD-ROM drive, DVD-ROM drive, or from other sources.

As will be described below, graphics system 112 may be configured to morph 3D graphics data received by the system. It is noted that while graphics system 112 is depicted as part of computer system 80, graphics system 112 may also be configured as a stand-alone device (e.g., with its own built-in display). Graphics system 112 may also be configured as a single chip device, as part of a system-on-a-chip or a multi-chip module, as a PCI board, as part of a computer system mother board, or as part of a single board computer (e.g., for a set-top box).

Figure 6:
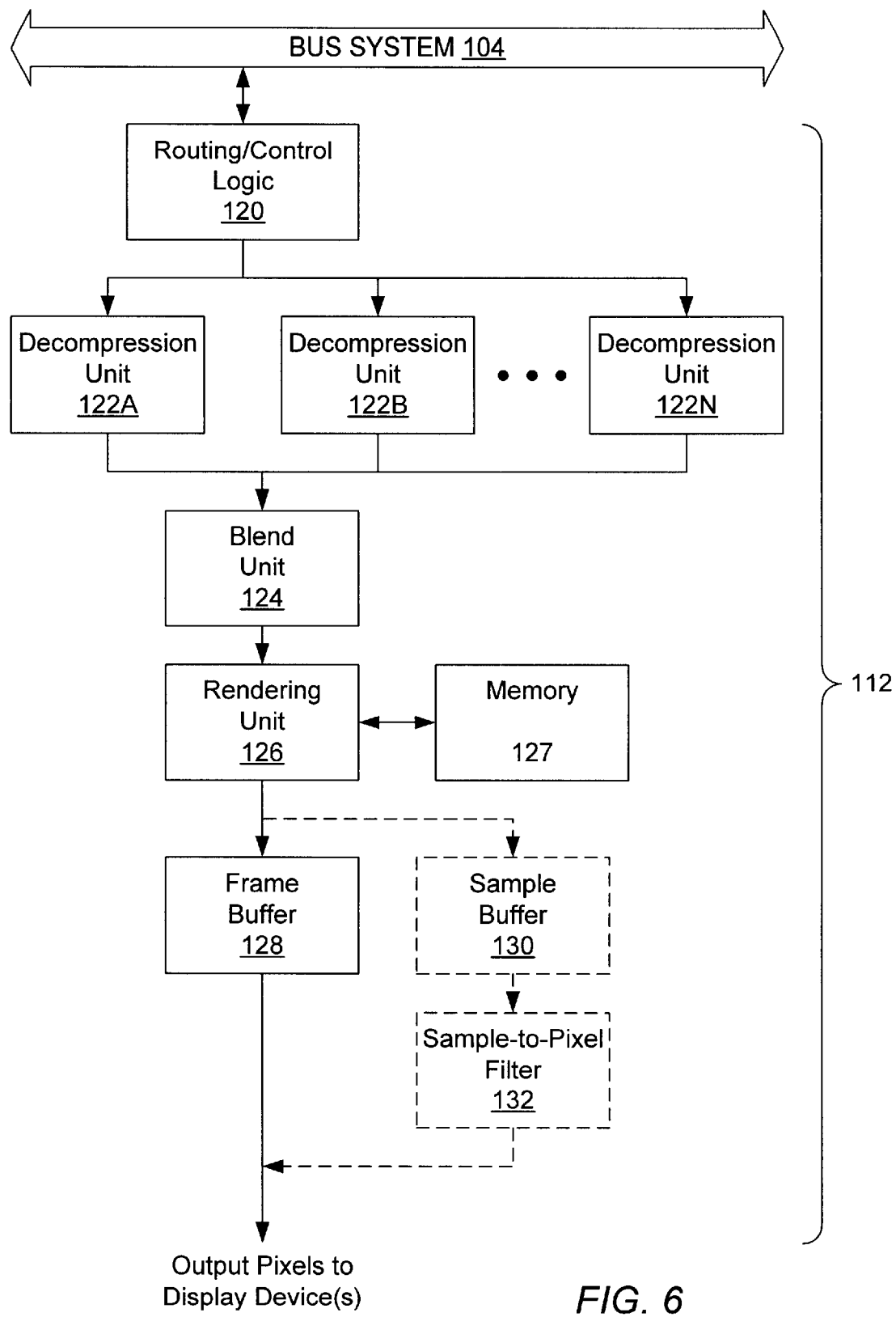
FIG. 6 is a block diagram illustrating more details of one embodiment of the graphics system of FIG. 5.

FIG. 6—Graphics System

Referring now to FIG. 6, a block diagram illustrating details of one embodiment of graphic system 112 is shown. In this embodiment, graphic system 112 comprises routing/control logic 120, decompression units 122A–N, blend unit 124, rendering unit 126, memory 127, and frame buffer 128. As the figure indicates, in a different embodiment graphic system 112 may comprise sample buffer 130 and sample-to-pixel filter 132 in lieu of frame buffer 128. Routine/control logic 120 operates as the interface between graphic system 112 and the bus system 104.

Routing/control logic 120 is coupled to system bus 104 and decompression units 122A–N. Blend unit 124 is coupled between decompression units 122A–N and rendering unit 126. Rendering unit 126 is coupled between blend unit 124, memory 127, and frame buffer 128 (or sample buffer 130). In embodiments that utilize sample buffer 130, the buffer is coupled between rendering unit 126 and sample-to-pixel filter 132.

A. routing/control logic

Routing/control logic 120 is configured to received compressed three-dimensional graphics data from bus system 104 and route it to one or more of decompression units 122A–N. Routing/control logic 120 may also be configured to communicate with other subsystems within computer system 80 to control the flow of graphics data. It is noted that in some embodiments not all of the graphics data may be compressed, and not all of the graphics data may be three-dimensional graphics data. For example, traditional two-dimensional graphics data such as JPEG and bitmap data may also be conveyed to graphic system 112 for processing and display.

Routing/control logic 120 may be configured to detect sub-streams of three-dimensional graphics data corresponding to one or more starting, intermediate, or final states for a three-dimensional graphical object that is to be morphed. Routing/control logic 120 may be configured to route each sub-stream that corresponds to a particular graphical object state to a different decompression unit. Each decompression unit may then decompress the corresponding sub-stream and convey the decompressed graphical data to blend unit 124. As described in further detail below, the decompressed graphical data may be accompanied by one or more weighting factors. Blend unit 124 may be configured to receive the decompressed graphical data and apply the weighting factors. Blend unit 124 may then sum the weighted graphical data corresponding to each sub-stream. For example, assuming that there are only two relevant states of a graphical object being morphed (i.e., an initial state and a final state), and assuming a weighting factor of 20 percent for the initial state and 80 percent for the final state, then the resulting blended graphical data may reflect a graphical object that is approximately three quarters of the way from the initial state to the final state. This is described in greater detail below (see equations 1 and 2).

B. decompression units

In one embodiment, a "decompression unit" is a unit that is configured to receive compressed three-dimensional graphics data and decompress the three-dimensional graphics data into uncompressed three-dimensional graphics data. The three-dimensional graphics data may be compressed using a number of different techniques, including for example geometry compression, delta encoding, delta-delta encoding, and arithmetic compression. Error checking and correction may also be performed by the decompression unit in some embodiments.

Depending upon the type of compressed graphics data received, decompression units 122A–D may be configured to perform arithmetic decoding, run-length decoding, Huffman decoding, and dictionary decoding (e.g., LZ77, LZSS, LZ78, and LZW). In another embodiment, decompression units 122A–N may be configured to decode graphics data that has been compressed using a "geometry compression" scheme. Geometry compression of 3D graphics data may achieve significant reductions in data size while retaining most of the image quality. Methods for compressing and decompressing 3D geometry are described in U.S. Pat. No. 5,793,371, entitled "Method And Apparatus For Geometric Compression Of Three-Dimensional Graphics Data," and U.S. patent application Ser. No. 09/332,322, filed on Jun. 14, 1999, entitled "Geometry Compression for Regular and Irregular Mesh Structures" In embodiments of graphics system 112 that support decompression of data compressed using geometry compression, the graphics data received by each decompression unit 122A–N is decompressed into one or more geometric primitives which are then conveyed to blend unit 124. In some embodiments, decompression units 122A–N may also perform additional processing on the primitives (e.g., culling or clipping of primitives in preparation for eventual rendering of the primitive). Decompression units 122A–N may be any suitable type of high performance processor (e.g., specialized decompression processor ASICs, arithmetic units, multimedia processors, DSPs, or general purpose processors).

C. blend unit

In one embodiment, a "blend unit" is a unit that is configured to perform mathematical operations to blend (i.e., combine) two or more inputs to form a morphed output, wherein each input is information corresponding to a particular state of a graphical object being morphed. The blend unit may be configured to blend the inputs via interpolation or averaging, or some other mathematical operation, and one or more weighting values may be used by the blend unit as indicators of how much each input should contribute to the morphed output, wherein the morphed output is information corresponding to a potentially different particular state of a graphical object being morphed. A blend unit may be implemented in a number of ways, e.g., with custom logic and arithmetic circuits, an ALU, a multiplier, a DSP core, an FPU core, or a general purpose processor or core. In some configurations, the blend unit may be formed by a number of smaller "sub-blend units" that are individual blend units configured to be cascaded together to form larger blend units.

Blend unit 124 may be configured to (i) receive the decompressed primitives from decompression units 122A–N, (ii) blend or morph them, and (iii) convey the resulting blended graphics data to rendering unit 126. Note, as used herein the verbs "blend" and "morph" are used interchangeably, as are the adjectives "blended" and "morphed".

D. rendering units

In one embodiment, a "rendering unit" is a unit that is configured to generate pixels or samples from the graphics data received by the rendering unit. A rendering unit may be implemented in a number of ways, e.g., with custom logic and arithmetic circuits, an ALU, a multiplier, a DSP core, an FPU core, or a general purpose processor or core. It is noted that rendering unit 126 may comprises a number of smaller functional units, e.g., a separate set-up/decompress unit and a lighting unit. Furthermore, graphics system 112 may comprise a plurality of rendering units configured to operate in parallel to improve performance.

Rendering unit 126 may be configured to perform a number of different tasks one the blended graphics data, such as transformation, culling, clipping, lighting, texturing, depth cueing, transparency processing, setup, and screen space rendering of the blended graphics data. Rendering unit 126 may be configured to render pixels for samples into frame buffer 128 or sample buffer 130, respectively. Rendering unit 126 may include a plurality of sub-units, each configured perform a particular subset of the above tasks.

Transformation refers to manipulating an object and includes translating the object (i.e., moving the object to a different location), scaling the object (i.e., stretching or shrinking), and rotating the object (e.g., in three-dimensional space, or "3-space"). Clipping refers to defining the limits of the displayed image (i.e., establishing a clipping region, usually a rectangle) and then not rendering or displaying pixels that fall outside those limits. Lighting refers to calculating the illumination of the objects within the displayed image to determine what color and or brightness each individual object will have. Depending upon the shading algorithm being used (e.g., constant, Gourand, or Phong), lighting may be evaluated at a number of different locations. For example, if constant shading is used (i.e., each pixel of a polygon has the same lighting), then the lighting need only be calculated once per polygon. If Gourand shading is used, then the lighting is calculated once per vertex. Phong shading calculates the lighting on a per-pixel basis.

Generally, screen-space set-up refers to setting the primitives up for screen-space rasterization (e.g., calculating slopes or coefficients for plane equations and initial pixel positions).

Screen-space rendering refers to the calculations performed to actually calculate the data used to generate each pixel that will be displayed. Each pixel is calculated and then stored in a frame buffer. The contents of the frame buffer are then output to the display device to create the final image.

As shown in the figure, in some embodiments graphics system 112 may utilize sample buffer 130 and sample-to-pixel filter 132 in lieu of or in addition to frame buffer 128. These embodiments may be particularly useful to implement high quality anti-aliasing using super-sampling. A graphics system capable of super-sampling is described in detail in U.S. patent application Ser. No. 09/251,840, filed on Feb. 17, 1999, titled "Graphics System With A Hardware Frame Buffer Having Programmable Super-Sample Positions". This application is hereby incorporated by reference in its entirety.

Generally, in embodiments of graphics system 112 that are configured to use sample buffer 130, sample-to-pixel filter 132 is used to read the samples from sample buffer 130 and filter them into output pixels. This filtering process may perform some of the tasks listed above in connection with rendering unit 126 (e.g., depth cueing).

Output pixels (whether read from frame buffer 128 or generated by sample-to-pixel filter 132) are conveyed to one or more display devices. In some embodiments, graphic system 112 may further comprise one or more digital to analog converters (DACs) to generate analog video signals for the display devices. Alternatively, graphic system 112 may be configured to convey the pixels in a digital format directly to a monitor or display device configured to receive such a format (e.g., an LCD display).

E. rendering memory

In some embodiments, rendering unit 126 may be coupled to memory 127. Memory 127 may serve a number of purposes, e.g., as a cache for instructions and/or data, as a scratch-pad memory, and as a texture map memory.

F. frame buffer

As noted above, in some embodiments graphic system 112 may be configured with a frame buffer memory 128. A number of different types of memory may be used to implement frame buffer 128, e.g., VRAMs (video random access memories), SGRAMS (Synchronous Graphic Random Access Memory), or 3DRAMs (3D random access memories). Frame buffer 128 may be at least partially double buffered, and may be configured to color information for each pixel to displayed on the output display device. Frame buffer 128 may also be configured with storage for z (depth) information. In some embodiments, graphics system 112 may be configured to perform filtering operations on the pixel values stored in or read from frame buffer 128 (e.g., to implement anti-aliasing).

G. sample memories

As also noted above, in other embodiments graphics system 112 may include sample buffer 130 and sample-to-pixel filter 132 in lieu of frame buffer 128. Use of a sample buffer and sample-to-pixel filters may allow graphics system 112 to perform higher-quality real-time anti-aliasing and other effects. As with frame buffer 128, sample memories 160A–160N may comprise any of a number of different types of memories (e.g., SDRAMs, SRAMs, RDRAMs, 3DRAMs, or next-generation 3DRAMs) in varying sizes.

H. sample-to-pixel filters

Sample-to-pixel filter 132 may be coupled between sample buffer 130 and one or more display devices. Sample-to-pixel filter 132 is configured to read selected samples from sample buffer 130 and then perform a filtering or convolution (e.g., a weighting function or a low pass filter) on the samples to generate the output pixels which are conveyed to the display device. Sample-to-pixel filter 132 may be programmable to allow different filtering functions to be applied at different times depending upon the type of output desired. In one embodiment, sample-to-pixel filter 132 may implement a 5×5 super sample reconstruction band pass filter to convert super sampled data from sample buffer 130 into individual pixel values. The operation of one type of sample-to-pixel filter is described in greater detail in U.S. patent application Ser. No. 09/251,840, filed on Feb. 17, 1999, titled "Graphics System With A Hardware Frame Buffer Having Programmable Super-Sample Positions".

FIG. 7—Morphing

In general, graphic system 112 is configured to perform morphing of 3D graphics data. As noted above, morphing may be generally thought of as an interpolation between two states of an object. However, on a more simple scale, morphing may be thought of as interpolating between a first set of points $P_{i=0}$ and a second set of points $P_{i=1}$. The interpolation may be performed by applying a weighting factor or weighting value to each corresponding point in group $P_{i=0}$ and $P_{i=1}$.

Turning now to FIG. 7, an example of morphing a geometric primitive is shown. In this example, primitive 300 which comprises vertices $V_{A1}$, $V_{A2}$, and $V_{A3}$ is morphed into primitive 308 which comprises vertices $V_{B1}$, $V_{B2}$, and $V_{B3}$. As previously noted, morphing may be thought of as an interpolation type process. To smoothly morph from primitive 300 to primitive 308, graphic system 112 may be configured to calculate one or more intermediate primitives or blended primitives that are rendered to generated intermediate frames. These intermediate frames smooth the visual transition form primitive 300 to primitive 308 thereby creating a more pleasing visual effect for the viewer. As those familiar in the art will appreciate, each vertex of primitive 300 may include a variety of different types of information, including position information (x', y', z'), color information (r', g', b'), transparency information ($\alpha$'), normal information (Nx', Ny', Nz'), and other types of information (e.g., texture mapping information). It is noted that primitive 308 need not necessarily be the final state (i.e., the end) of the morphing effect. In some embodiments, a primitive may morph from an initial state to one or more intermediate states before morphing to the final state. In this example, however, primitive 300 morphs from its initial state to a final state corresponding to primitive 308.

To calculate the vertex parameters for vertices $V_{x1}$, $V_{x3}$, and $V_{x3}$, that correspond to first intermediate primitive 302, weighting factors may be applied to the vertex components of primitives 300 and 308. This calculation for primitive 302 is shown in block 303. Similarly, the calculation for determine the vertex parameters for $V_{x1}$, $V_{x3}$, and $V_{x3}$, that correspond to primitive 304 is shown in block 305. As these blocks indicate, varying the weighting factors will determine how much the resulting primitive resembles primitives 300 and 308. It is noted that while the example in the figure only uses two states (i.e., an initial state and a final state) to determine the vertex parameter values for intermediate primitives 302 and 304, in some embodiments, graphic system 112 may be configured to interpolate between multiple states to calculate intermediate primitives 302 and 304.

Turning now to FIG. 8, two equations are shown that may be used to perform such multiple state interpolation. Equation 310 illustrates that to calculate an x component of vertex $V_{x1}$ from primitive 302 using an initial state $V_A$, two intermediate state $V_B$ and $V_C$, and a final state $V_D$, may entail the use of four weighting factors (i.e., $wf_A$, $wf_B$, $wf_C$, and $wf_D$). Each weighting factor is applied to the vertex component (x in this case) of the corresponding state. The weighted vertex components are then summed to generate $V_{X1}$. In some cases, graphic system 112 may be configured to normalized the blended vertex primitives (e.g., $V_{X1}$) to prevent the blended graphics data from overwhelming non-blended graphics data. Equation 312 illustrates how normalization may be accomplished by dividing the results from equation 310 by the sum of the weighting factors. Other methods for normalization are also possible and contemplated. For example, in one embodiment the weighting factors ($wf_A$, $wf_B$, $wf_C$, and $wf_D$) may be pre-normalized (i.e., such that their sum always equals one).

Additional variations on these embodiments are possible and contemplated. For example, in some embodiments, the graphics data for primitive 308 corresponding to the second state of the morphing sequence may be delta encoded relative to the graphics data corresponding to primitive 300. Assuming graphics primitive 308 is relatively similar to graphics primitive 300, delta encoding may reduce the overall size of the graphics data for the morphing sequence.

Figure 9A:
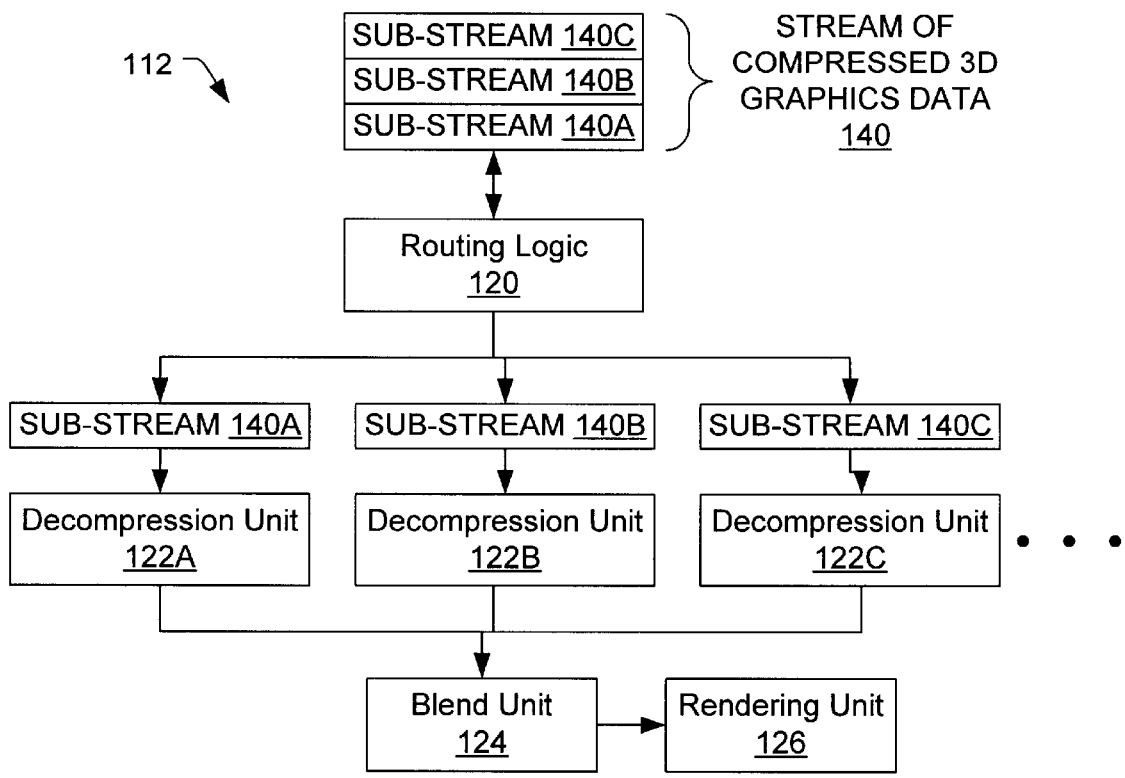
FIG. 9A is a diagram illustrating one embodiment of a graphics system configured to perform 3D morphing.
Figure 9B:
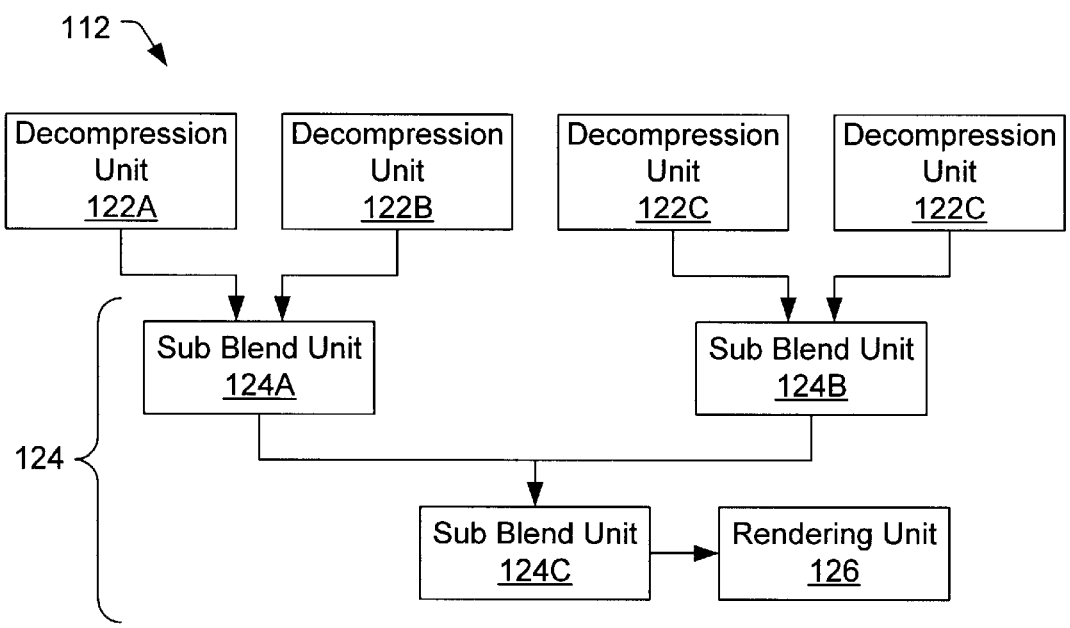
FIG. 9B is a diagram illustrating another embodiment of a graphics system configured to perform 3D morphing.
Figure 10:
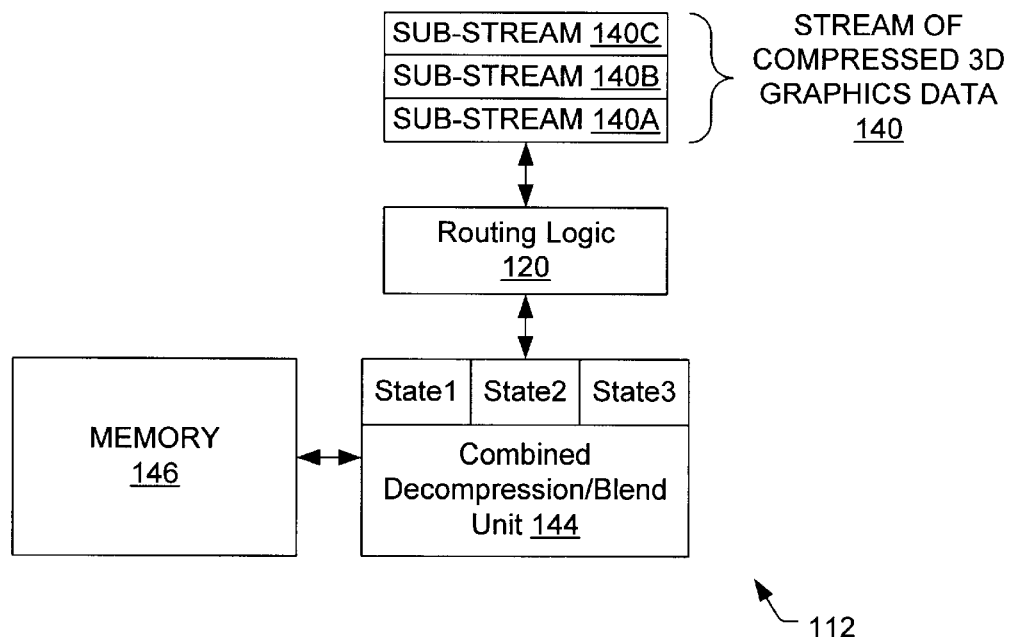
FIG. 10 is a diagram illustrating yet another embodiment of a graphics system configured to perform 3D morphing.
Figure 11:
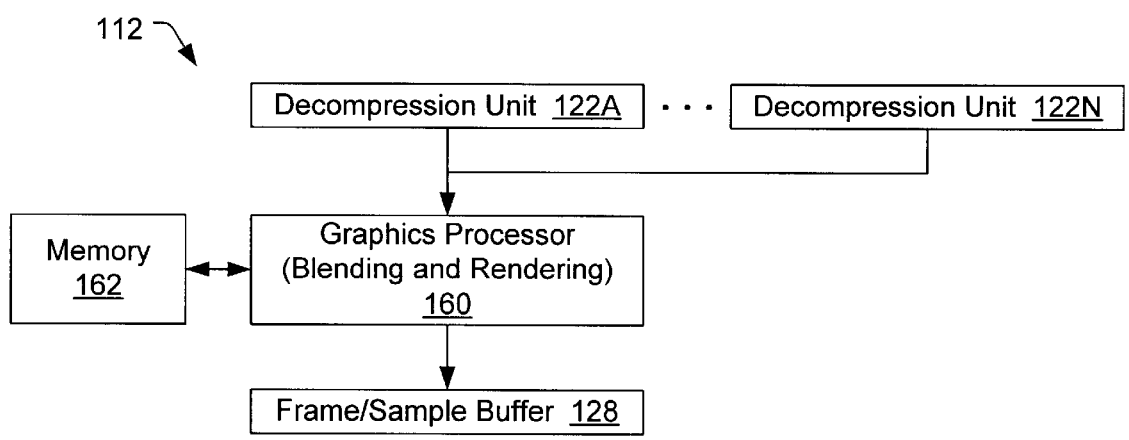
FIG. 11 illustrates another embodiment of a graphics system configured to perform 3D morphing.

FIGS. 9–11—Embodiments of a Graphics System

Turning now to FIG. 9A, details of one embodiment of graphic system 112 are shown. In this embodiment, a stream of compressed 3D graphics data 140 is received by routing logic 120 and distributed to decompression units 122A–122C. As described in the figure, stream 140 may comprise a plurality of sub-streams of data (i.e., 140A–140C), wherein each sub-stream of compressed 3D graphics data corresponds to a particular state of the graphical object being morphed. Routing logic 120 may be configured to detect each sub-stream within graphics data 140 and route individual sub-streams to particular decompression units 122A–C. Decompression units 122A–C may be configured to decompress individual sub-streams of graphics data and convey the decompressed graphics data to blend unit 124. In some embodiments, decompression units 122A–C may also be configured to extract weighting factors from the sub-streams of graphics they are decompressing. These weighting factors may be conveyed to blend unit 124 along with the corresponding decompressed graphics data. As previously noted, blend unit 124 may be configured to apply the weighting factor to the graphics data and combine the results.

Turning now to FIG. 9B, another embodiment of graphics system 112 is shown. In this embodiment, multiple sub-blend units 124A–124C are cascaded to effect blending of four different states or sub-streams of graphics data being decompressed by decompression units 122A–122D. As the figure indicates, the output from the final sub-blend unit 124C may be conveyed to one or more rendering units for transformation, lighting, rendering, etc.

Turning now to FIG. 10, yet another embodiment of graphic system 112 is shown. In this embodiment, graphic system 112 comprises routing logic 120 and a combined decompression/blend unit 144. As the figure illustrates, combined decompression/blend unit 144 may include logic and/or memory to individually decompressed multiple sub-streams corresponding to multiple initial, intermediate, and final states. It is noted that each sub-stream 140A–140C may comprise graphics data, weighting information, and additional information configured to allow combined decompression/blend unit 144 correlate primitives that correspond to different states of a graphical object being morphed. For example, if a cube is being morphed into a sphere, the vertices on the surface of the cube may be identified with particular identifier information such that decompression/ blend unit 144 can determine which vertices on the cube correspond to particular vertices on the sphere. In some embodiments, decompression/blend unit 144 may be coupled to a memory 146 that is configured to store graphics data, weighting factors, and the additional correlating information.

Turning now to FIG. 11, yet another embodiment of graphic system 112 is shown. In this embodiment, graphic system 112 comprises decompression units 122A–122N, graphics processor 160, memory 162, and frame/sample buffer 128. In this configuration, decompression units 122A–122N are configured to route decompressed graphics data to graphics processor 160. Graphics processor 160 is configured to perform both blending and rendering functions. The results of the rendering functions are written to frame/sample buffer 128. Graphics processor 160 may then be configured to use memory 162 to store intermediate data (e.g., weighted graphics data) in support of the blending and rendering functions. Memory 162 may be implemented as a fast local memory for processor 160 (e.g., as SRAM, SDRAM, or RDRAM). Graphics processor 106 may use memory 162 as an accumulation buffer. Each time processor 160 receives a morphing primitive, the processor may be configured to (i) apply a weighting factor, (ii) read any corresponding weighted data previously stored in memory 162, (iii) sum the weighted primitives, and (iv) store the results back into memory 162. This configuration may be useful in applications having graphics data streams in which the order in which corresponding primitives are encoded into the data stream is unpredictable.

In some embodiments of graphics system 112, graphics processor 160 may be configured to receive decompressed primitives from decompression units 122A–N and store them in memory 162 (optionally applying some preprocessing before storing them to memory). Upon receiving the last of the primitives that may contribute to particular frame, the graphics processor may read all other corresponding primitives from memory 162, apply weighting factors, and sum the weighted primitives to form a morphed primitive. The graphics processor may also incrementally accumulate primitives (i.e., receive first primitive, store first primitive, receive second primitive, combine first and second primitives according to their weights, and store for next cycle). Similarly, graphics processor may store all primitives that will contribute to a particular morphed primitive until some later time at which the graphics processor is ready to actually combine the stored primitives to form the morphed primitive. In these embodiments, memory 162 may comprise a large array of memory (e.g., SDRAM or RDRAM). Memory 162 may also include one or more levels of cache supporting rapid access of stored data by graphics processor 160. As with previously disclosed embodiments, graphics processor 160 may be programmable to perform different weighting and morphing functions on the primitives before they are stored into memory 162 or after they are read from memory 162.

In one embodiment graphics system 112 may be configured to support morphing multiple states of an object to generate intermediate states that allow different combinations of visual appearance. For example, in one embodiment graphics system 112 may be configured to store a plurality of polygons into memory 162, wherein the polygons correspond to an object (e.g., a human face) in a different state (e.g., with a happy expression, with a sad expression, with a confused expression, etc.). Graphics process or 160 may then be configured to morph different combinations of the stored object states in response to receiving particular instructions. Such a configuration would allow the graphics system to render a face with a wide variety of expressions based on a few predefined expressions stored in memory 162. The weighting functions used may use all or merely a subset of the stored object states to generate the desired intermediate expression. Similarly, the weighting functions may be uniform or non-uniform. Taking this one step further, graphics processor 160 may be configured to detect vertices that are tagged or identified as having special properties. In some morphing applications, tears or cracks may appear in an object. For example, when morphing a human figure from a first position with arms at its side to a second position with arms outstretched, cracks may appear at the joint of the arm and the torso. Thus, some vertices at the boundary of the arm and torso may be tagged as "edge vertices". The graphics processor may be configured to treat these vertices differently (e.g., leave them stationary) to prevent visible cracks from occurring.

FIG. 12—Stream of Compressed 3D Data

Figure 12A:
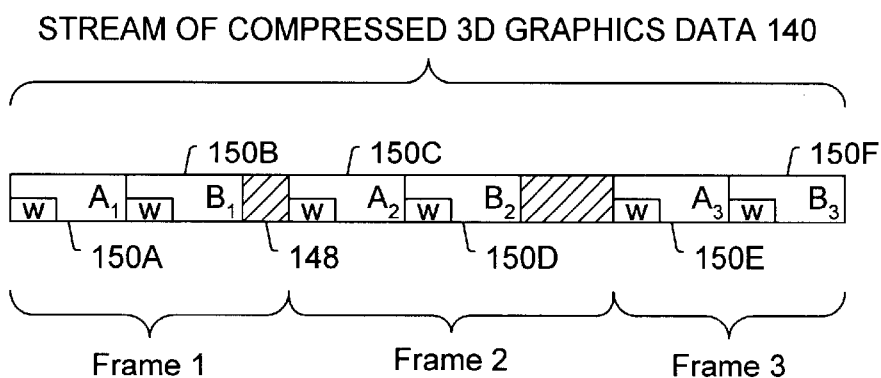
FIGS. 12A–C illustrate different embodiments of methods for encoding 3D graphics data to enable morphing.

Turning now to FIG. 12A, one embodiment of a stream of compressed 3D graphics data 140 is shown. In this embodiment, stream 140 comprises a plurality of sub-streams 150A–150F. As indicated by the figure, each sub-stream includes a weight factor (i.e., designated by a "w"). It is noted that in some embodiments the weighting information "w" may be stored as alpha information. In this embodiment, sub-stream 150A comprises graphics information for an initial state A1. Similarly, sub-stream 150B comprises graphics information corresponding to a final state B1. It is also noted that not all of the graphical objects displayed in a particular frame are necessarily morphed graphical objects. For example, a car may morph into a tiger, but the background (e.g., a forest) may be a standard graphical object that does not morph. This non-morphing graphics data is represented by shaded blocks (e.g., block 148). As the figure indicates, sub-strearns 150A, and 150B and non-morphing graphics data 148 generate a first frame. The next frame in the morphing sequence is generated by sub-stream 150C, and sub-stream 150D, and additional non-morphing graphics data. Similarly, the third frame of a morphing sequence is generated from sub-streams 150E and 150F. in this embodiment, the graphics data for the morphing sequence is encoded in a frame by frame serial or streaming fashion. For example, two object states (i.e., A1 and B1; A2 and B2; A3 and B3) are morphed and rendered along with non-morphing graphics data for each sequential frame of the morphing sequence. This format may be particularly usefull for applications such as 3D interactive movies. One embodiment of graphic system 112 configured to play back three-dimensional movies is disclosed in U.S. patent application Ser. No. 09/268,397, filed on Mar. 15, 1999, titled "Generation and Playback of Three-Dimensional Movies".

Figure 12B:
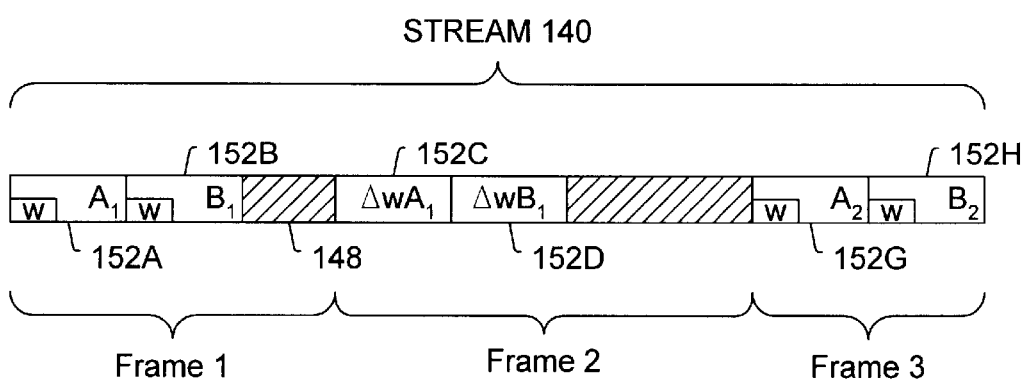

Turning now to FIG. 12B, another embodiment of graphics data stream 140 is shown. In this embodiment, the graphics data for each frame is encoded in a similar fashion as the embodiment in FIG. 9A, but the graphics data in sub-streams 152C and 152D that are used to form the second frame of the sequence are delta encoded relative to the graphics data in sub-stream 152A and 152B. It is noted that, depending on the particular implementation, the graphics data corresponding to the particular states of the object(s) being morphed may be delta encoded, or simply the change in weighting factors may be delta encoded (as represented in blocks 152C and 152D).

Figure 12C:
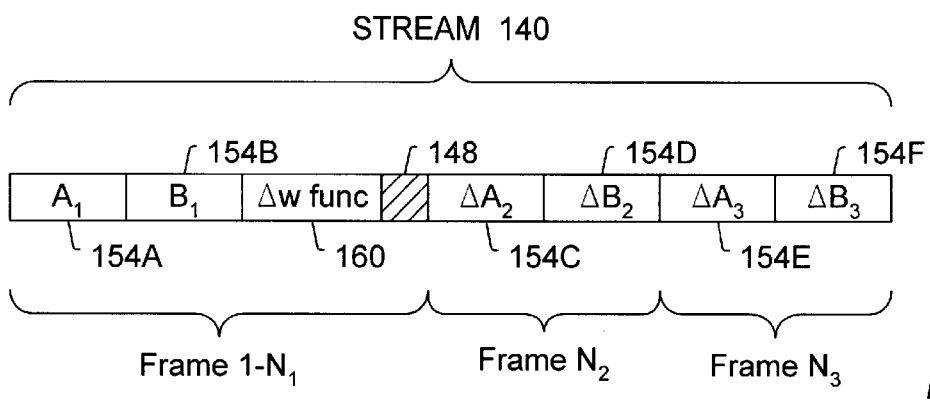

Turning now to FIG. 12C, yet another embodiment of graphics data stream 140 is shown. In this embodiment, multiple frames of morphing graphics data are encoded using a weighting factor function 160. In this embodiment, the initial state represented by sub-streams 154A and the final state represented by sub-stream 154B are modified according to a delta w function 160. For example, the delta w function may instruct the blend unit to morph from initial state A1 to final state B1 in ten frames. The delta w function may dictate how the weighting factors for initial state A1 and final state B1 change over the course of the ten frames. As with previous embodiments, additional non-morphing data 148 that may or may not change during the ten frame sequence. For example, the background forest may have branches that are waving in the wind as the car is morphed into a tiger. As further indicated by the figure, intermediate states for the morphing process may be delta encoded into the graphics stream 140 (e.g., see blocks 154C–154F). In addition to graphics data and weighting factors, each frame or sub stream may comprise additional control information usable by the graphics system to determine when all the morphing-related information has been received for a particular frame. In some embodiments, the control information (and possibly the weighting function) may be embedded within the stream of compressed data as an "interpolate vertex command". This command may be configured to specify which vertices are to be interpolated. The command may also provide connectivity information and specify which vertices, if any, are special vertices that are not to be rendered (i.e., to be only used for morphing).

FIGS. 13–14—Compressing/decompressing Graphics Data

Turning now to FIG. 13, one embodiment of a method for compressing 3D graphics data for morphing is shown. In this embodiment, 3D graphics data corresponding to an initial state of a graphical object is received (step 200). Similarly, three-dimensional graphics data corresponding to a final state of the graphical object is also received (step 202). As previously noted, additional 3D graphics data corresponding to intermediate states of a graphical object may also be received. Similarly, three-dimensional graphics data corresponding to other non-morphing graphical objects to be rendered in the morphing frames may also be received. Next, the three-dimensional graphics data corresponding to both the initial state and the final state of the graphical object to be morphed are compressed (steps 204 and 206), preferably using geometry compression techniques. The two sets of compressed three-dimensional graphics data may then be merged into a single stream of compressed three-dimensional graphics data (step 208). Next, weighting information may be embedded into the merged stream of compressed three-dimensional graphics data (step 210). As previously noted, there are a number of different techniques possible for embedded the weighting information in the graphics stream. Finally, the stream of compressed three-dimensional graphics data with the embedded weighting information may be transmitted across a communications network (e.g., a local area network or the internet), as shown in step 212. It is noted that the flow chart depicted in the figure is merely for explanatory purposes only, and is not intended to be limiting. For example, some of the steps illustrated in the figure may be performed in parallel (e.g., steps 204 and 206). Similarly, additional steps may be added, or steps may be combined or performed in a different order.

Turning now to FIG. 14, one embodiment of a method for rendering compressed three-dimensional graphics data with morphing graphical objects is shown. In this embodiment, a first set of compressed 3D graphics data is received and decompressed (step 213). Next, a first weighting factor is applied to the set of 3D graphics data (step 214). As previously noted, the weighting factor need not be implied to all of the first set of compressed 3D graphics data. Next, the weighted set of 3D graphics data may be stored to a memory (step 216). A second set of 3D graphics data may be compressed at a later time (step 218), and a second weighting factor may be applied to the second set of 3D graphics data (step 220). Upon detecting that data within the second set of decompressed and weighted graphics data corresponds to the weighted first set of 3D graphics data stored in memory, the graphic system may be configured to read the first set of weighted 3D graphics data from the memory (step 222). Finally, the weighted first set of 3D graphics data and the second set of weighted are combined (e.g., summed) to form the resulting morphed graphics data that may be rendered for eventual display, and/or stored back to memory for future blending with additional states that are received from the graphics data stream.

Additional Embodiments

In some embodiments, the graphics data to be morphed may be restricted to graphical objects that generally have the sample topology (e.g., a corresponding number of vertices). For graphics data to be morphed that does not have the sample topology, the artist generating the graphics data may use his or her artistic skills to generate 3D models of one or more desired intermediate frames that will act as bridges between the two objects with different topology. For example, in morphing from a car (state A) to a tiger (state E), the artist may prepare intermediate states B, C, and D that meet that artist's visual requirements and have vertices that generally correspond with the car and/or the tiger.

As may be seen from the examples described above, the weighting factors may correspond to a particular object, to a particular primitive, or to a particular vertex. Thus, in some embodiments each vertex may be independently weighted in the data stream. In other embodiments each vertex corresponding to a particular primitive may share a single weighting factor or function.

The system and methods described above may be used not only to morph between two different objects, but also to implement morphing between two different levels of detail (LOD). In many computer simulations, when an object is far away (e.g., on the virtual horizon), the object is drawn with a minimal LOD. For example, trees in a forest near the horizon may be drawn with only a few primitives to improve frame rates. However, as the viewpoint moves closer to the tree, a higher LOD may be used to render the trees (e.g., to add branches and leaves). In some cases, the change in LOD may appear abrupt to the viewer. For example a tree may appear as a green triangle in one frame and then suddenly have leaves and branches in the next frame. In some embodiments morphing may be used to smooth the transition form between different LODs. Depending upon the implementation, some objects may have vertices or primitives that are marked as "do not morph" while others are marked as "morph". Thus the artist may determine the optimum balance of visual appearance versus desired frame rate and/or data stream size.

In some embodiments, the weighting factors may be generated procedurally (e.g. based on run-time variables). One example may be a game in which the speed and amount of morphing is determined based on variables that change during run-time (e.g., a direct hit on a monster with a weapon may cause the monster to morph differently than a glancing blow). Other alternatives include storing information indicative of a linear or non-linear blending/morphing function. Please note that different primitive attributes (e.g., vertex parameter values such as color, and normals) may vary according to different weighting factors or blending/morphing functions. Furthermore, in some embodiments morphing may be performed on a "morphable subcomponent" of an object. For example, each leg of a dinosaur may be morphed using different weighting factors. Depending upon the exact implementation, load balancing in the graphics system may be disabled to allow the routing logic to route the compressed data to ensure that corresponding morphing primitives are routed to the same decompression and blending unit or units. In an alternate embodiment, different decompression and/or blending units may be configured to share memory or communicate directly with each other regarding the receipt of corresponding primitives to be morphed.

Thus, a system and method for encoding, decoding and rendering 3D graphics data to implement 3D morphing has been disclosed. Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. It is noted that the headings used herein are for organizational purposes only and are not intended to limit the description provided herein or the claims attached hereto.

What is claimed is:

1. A graphics system comprising:
one or more decompression units each configured to receive portions of a stream of compressed three-dimensional graphics data, wherein the stream of compressed three-dimensional graphics data includes weighting factors, wherein the one or more decompression units are configured to decompress the portions into a plurality of decompressed primitives, and wherein the decompression units are configured to extract and convey the weighting factors; and
a blend unit configured to receive decompressed primitives from the decompression units, wherein the blend unit is configured to apply the weighting factors to the decompressed primitives that are to be morphed, and wherein the blend unit is configured to combine corresponding weighted primitives to form morphed primitives, wherein the morphed primitives are usable to generate an image for display on a display device.

2. The graphics system of claim 1, wherein each decompressed primitive comprises a plurality of vertices, and wherein the blend unit is configured to apply the weighting factors to one or more the vertices of each of the decompressed primitives to be morphed.

3. The graphics system of claim 1, wherein the morphed primitive corresponds to an intermediate state between two different levels of detail.

4. The graphics system of claim 1, wherein the weighting factors are encoded as alpha information in the compressed three-dimensional graphics data.

5. The graphics system of claim 1, wherein the weighting factors vary on a frame-by-frame basis.

6. The graphics system of claim 1, wherein the weighting factors vary on a graphical object by graphical object basis.

7. The graphics system of claim 1, wherein the weighting factors vary on a per-vertex basis.

8. The graphics system of claim 1, wherein the weighting factors are delta encoded.

9. The graphics system of claim 1, wherein the stream of compressed three-dimensional graphics data includes weighting functions, wherein the weighting factors are calculated from the weighting functions.

10. The graphics system of claim 1, wherein the weighting factors are embedded within the stream of compressed three-dimensional graphics data as time-varying functions, and wherein the decompression units are configured to extract and convey the time-varying functions to the blend unit.

11. The graphics system of claim 1, wherein the weighting factors comprise a plurality of components $w_n$, wherein n is a positive integer representing the number of sets of decompressed graphics data used to form the morphed set of decompressed graphics data.

12. The graphics system of claim 1, wherein the blend unit comprises a plurality of cascaded sub-blend units, wherein each sub-blend unit is configured to blend two sets of decompressed graphics data according to two different weighting factor components.

13. The graphics system of claim 1, wherein the blend unit is further configured to normalize the morphed primitives.

14. The graphics system of claim 1, wherein the morphed primitives comprise a plurality of blended vertices, wherein each blended vertex $B_i$ is formed according to the formula $B_i = P_i^1 w_1 + P_i^2 w_2 + P_i^3 w_3 + \ldots$, wherein i is an integer representing a particular vertex number, wherein each $w_{1 \ldots n}$ represents one weighting factor applied to each particular vertex P received from the one or more decompression units.

15. The graphics system of claim 14, wherein the blended vertices $B_i$ comprise blended position information and blended color information.

16. The graphics system of claim 1, further comprising routing logic, wherein the stream of compressed three-dimensional graphics data comprises a plurality of different sub-streams of compressed graphics data, wherein each sub-stream includes information corresponding to a single state in a morphing effect, and wherein the routing logic is configured to route each sub-stream to a different decompression unit in a round-robin manner.

17. The graphics system of claim 1, further comprising:
one or more rendering units configured to receive the morphed primitives from the blend
unit and generate a plurality of pixels therefrom; and a frame buffer configured to receive and store the pixels from the rendering unit.

18. The graphics system of claim 17, further comprising:
a display device coupled to receive the pixels from the frame buffer.

19. The graphics system of claim 1, further comprising:
one or more rendering units configured to receive the morphed primitives from the blend
unit and generate a plurality of samples therefrom; and a sample buffer configured to receive and store the samples from the rendering unit.

20. The graphics system of claim 19, further comprising one or more sample-to-pixel calculation units configured to receive samples from the sample buffer and generate output pixels for refreshing a display device.

21. The graphics system of claim 20, further comprising:
a display device coupled to receive and display the output pixels.

22. A graphics system comprising:
one or more decompression units each configured to receive portions of a stream of compressed three-dimensional graphics data, wherein the stream of compressed three-dimensional graphics data includes at least one weighting function, wherein the one or more decompression units are configured to decompress the portions into a plurality of decompressed primitives, and wherein the decompression units are configured to extract and convey the at least one weighting function; and
a blend unit configured to receive decompressed primitives from the decompression units, wherein the blend unit is configured to derive weighting factors from the at least one weighting function and apply the weighting factors to the decompressed primitives that are to be morphed, and wherein the blend unit is configured to combine corresponding weighted primitives to form morphed primitives, wherein the morphed primitives are usable to generate an image for display on a display device.

23. A graphics system comprising:
one or more decompression units each configured to receive and decompress portions of a stream of compressed three-dimensional graphics data into a plurality of decompressed primitives, wherein each decompressed primitive comprises a plurality of vertices; and a blend unit configured to receive decompressed primitives from the decompression units, wherein the blend unit is configured to apply weighting factors to one or more of the vertices of each of the decompressed primitives to be morphed, and wherein the blend unit is configured to combine corresponding weighted primitives to form morphed primitives, wherein the morphed primitives are usable to generate an image for display on a display device;

wherein the morphed primitives comprise a plurality of blended vertices, wherein each blended vertex $B_i$ is formed according to the formula $B_i = P_i^1 w_1 + P_i^2 w_{2+} P_i^3 w_{3+} \ldots$, wherein i is an integer representing a particular vertex number, wherein each $w_{1 \ldots n}$ represents one weighting factor applied to each particular vertex P received from the one or more decompression units.

24. The graphics system of claim 23, wherein the blended vertices $B_i$ comprise blended position information and blended color information.

25. A graphics system comprising:

an input for receiving a stream of compressed three-dimensional graphics data, wherein the stream of compressed three-dimensional graphics data comprises a plurality of different sub-streams of compressed three-dimensional graphics data, wherein each sub-stream includes information corresponding to a single state in a morphing effect;

a plurality of decompression units each configured to receive and decompress portions of the stream of compressed three-dimensional graphics data into a plurality of decompressed primitives;

routing logic coupled to the input and to the plurality of decompression units, wherein the routing logic is configured to route each sub-stream to different ones of the decompression units in a round-robin manner;

a blend unit configured to receive decompressed primitives from the decompression units, wherein the blend unit is configured to apply weighting factors to the decompressed primitives that are to be morphed, and wherein the blend unit is configured to combine corresponding weighted primitives to form morphed primitives, wherein the morphed primitives are usable to generate an image for display on a display device.

26. The graphics system of claim 25, wherein each decompressed primitive comprises a plurality of vertices, and wherein the blend unit is configured to apply the weighting factors to one or more the vertices of each of the decompressed primitives to be morphed.

27. The graphics system of claim 25, wherein the stream of compressed three-dimensional graphics data includes weighting functions, wherein the weighting factors are calculated from the weighting functions.

28. A method, comprising:

receiving portions of a stream of compressed three-dimensional graphics data, wherein the stream of compressed three-dimensional graphics data includes weighting factors;

decompressing the portions into a plurality of decompressed primitives, wherein said decompressing operates to extract and convey the weighting factors; and applying the weighting factors to the decompressed primitives that are to be morphed; and combining corresponding weighted primitives to form morphed primitives, wherein the morphed primitives are usable to generate an image for display on a display device.

29. The method of claim 28, wherein each decompressed primitive comprises a plurality of vertices, and wherein said applying comprises applying the weighting factors to one or more the vertices of each of the decompressed primitives to be morphed.

30. The method of claim 29, wherein the morphed primitive corresponds to an intermediate state between two different levels of detail.

31. The method of claim 28, wherein the weighting factors vary on a frame-by-frame basis.

32. The method of claim 28, wherein the weighting factors vary on a graphical object by graphical object basis.

33. The method of claim 28, wherein the weighting factors vary on a per-vertex basis.

34. The method of claim 28, wherein the weighting factors are delta encoded.

35. The method of claim 28, wherein the stream of compressed three-dimensional graphics data includes weighting functions, wherein the weighting factors are calculated from the weighting functions.

36. The method of claim 28, wherein the weighting factors are embedded within the stream of compressed graphics data as time-varying functions, and wherein said decompressing comprises extracting and conveying the time-varying functions.

37. The method of claim 28, wherein the weighting factors comprise a plurality of components $w_n$, wherein n is a positive integer representing the number of sets of decompressed graphics data used to form the morphed set of decompressed graphics data.

38. The method of claim 28, wherein the morphed primitives comprise a plurality of blended vertices, wherein each blended vertex $B_i$ is formed according to the formula $B_i = P_i^1 w_1 + P_i^2 w_{2+} P_i^3 w_{3+} \ldots$, wherein i is an integer representing a particular vertex number, wherein each $w_{1 \ldots n}$ represents one weighting factor applied to each particular vertex P received after said decompressing.

39. The method of claim 28, wherein the stream of compressed three-dimensional graphics data comprises a plurality of different sub-streams of compressed graphics data, wherein each sub-stream includes information corresponding to a single state in a morphing effect;

the method further comprising routing each sub-stream to different decompression units in a round-robin manner.

40. The method of claim 28, further comprising:

rendering a plurality of pixels based on the morphed primitives; and storing the pixels in a buffer.

41. The method of claim 28, further comprising:

generating a plurality of samples based on the morphed primitives; and storing the samples in a buffer.

42. The method of claim 41, further comprising:

generating output pixels based on the samples stored in the buffer; and providing the output pixels for refreshing a display device.

43. A computer system comprising:

a microprocessor;

a main system memory;

a bus system coupling the microprocessor and the main system memory; and a decompression unit coupled to the bus system, wherein the decompression unit is configured to receive and decompress portions of a stream of compressed three-dimensional graphics data, wherein the decompression unit is configured to generate a morphed set of decompressed graphics data by (i) decoding the compressed graphics data; (ii) decoding weighting factors from the compressed graphics data; (ii) applying the weighting factors to the decompressed graphics data; and (iii) summing corresponding portions of the weighted graphics data, wherein the morphed set of decompressed graphics data is usable to generate an image for display on a display device.

44. A graphics system comprising:
a decompression unit configured to receive and decompress a stream of compressed three-dimensional (3D) graphics data, wherein the stream comprises information describing at least an initial state of a graphical object to be morphed and a final state of the graphical object to be morphed;
a graphics processor configured receive the decompressed 3D graphics data; and
a memory coupled to the graphics processor, wherein the graphics processor is configured to perform the following: (i) store the decompressed 3D graphics data corresponding to the initial state of the object into the local memory, (ii) read the stored 3D graphics data corresponding to the initial state of the object from the memory in response to receiving decompressed 3D graphics data corresponding to the final state of the object, (iii) blend the 3D graphics data corresponding to the initial and final states of the object, and (iv) perform transformation and lighting calculations on the blended 3D graphics data to form output pixels, wherein the output pixels are usable to generate an image for display on a display device.

45. The graphics system as recited in claim 44, wherein the graphics processor is configured to blend the 3D graphics data corresponding to the initial and final states of the object according weighting factors embedded within the stream of compressed 3D graphics data.

46. The graphics system as recited in claim 44, wherein the graphics processor is configured to repeatedly blend the decompressed 3D graphics data according a series of different weighting factors embedded within the stream of compressed 3D graphics data to produce a plurality of sets of blended 3D graphics data, wherein each set of blended 3D graphics data corresponds to a particular intermediate state of the object being morphed.

47. A method for morphing compressed three-dimensional (3D) graphics data, the method comprising:
receiving a first set of compressed 3D graphics data, wherein the first set of compressed 3D graphics data includes first weighting information useable in forming morphed 3D graphics primitives;
decompressing the first set of compressed 3D graphics data, wherein said decompressing includes extracting said first weighting information, wherein said weighting information comprises a first weighting factor;
applying the first weighting factor to the first set of 3D graphics data;
storing the weighted first set of 3D graphics data to a memory;
receiving a second set of compressed 3D graphics data, wherein the second set of compressed 3D graphics data includes second weighting information useable in forming morphed 3D graphics primitives;
decompressing the second set of compressed 3D graphics data, wherein said decompressing includes extracting said second weighting information, wherein said second weighting information comprises a second weighting factor;
applying the second weighting factor to the second set of 3D graphics data;
reading the weighted first set of 3D graphics data from the memory; and
combining the weighted first set of 3D graphics data and the weighted second set of 3D graphics data to form a morphed set of 3D graphics data, wherein the morphed set of 3D graphics data is usable to generate an image for display on a display device.

48. The method as recited in claim 47, wherein said reading is performed in response to detecting that the second set of graphics data corresponds to the first set of graphics data.

49. The method as recited in claim 47, wherein the first set of graphics data represents an initial state of an object to be morphed, and wherein the second set of graphics data represents a second state to which the object is morphed.

50. The method as recited in claim 47, wherein the first set of graphics data and the second set of graphics data have the same number of geometric primitives and the same geometric primitive connectivity information.

51. The method as recited in claim 47, further comprising:
storing the morphed set of graphics data, and
repeating said decompressing, said applying, said reading, said combining, and said storing for additional sets of 3D graphics data and for additional weighting factors.

52. The method as recited in claim 47, wherein the weighting factors vary on a frame-by-frame basis, and wherein said decompressing, said applying, said reading, said combining, and said storing are repeated for a predetermined number of frames until the first weighting factor is sub-stantially zero and the second weighting factor is substantially one.

53. The method as recited in claim 47, wherein the weighting factors vary on a frame-by-frame and graphical object by graphical object basis, and wherein said decompressing, said applying, said reading, said combining, and said storing are repeated for a predetermined number of frames until the first weighting factor is substantially zero and the second weighting factor is sub-stantially one.

54. The method as recited in claim 47, further comprising receiving the first and second sets of compressed 3D graphics data from a network.

55. A method for encoding graphics data, the method comprising:
receiving three-dimensional (3D) graphics data corresponding to an initial state of a graphical object to be morphed;
receiving 3D graphics data corresponding to a final state of the graphical object to be morphed;
compressing the 3D graphics data corresponding to the graphical object in the initial state into a first sub-stream of data;
compressing the 3D graphics data corresponding to the graphical object in the final state into a second sub-stream of data;
merging the first sub-stream and second sub-stream into a single stream of compressed 3D graphics data, and
embedding weighting information into the merged single stream of compressed graphics data, wherein the weighting information is usable to blend the 3D graphics data corresponding to the graphical object in the initial state and the 3D graphics data corresponding to the graphical object in the final state.

56. The method as recited in claim 55, wherein the compressed 3D graphics data in the first sub-stream is alternated with the compressed 3D graphics data in the second sub-stream to form the single stream of compressed 3D graphics data.

57. The method as recited in claim 55, further comprising transmitting the encoded data across a network.

58. The method as recited in claim 55, further comprising:
   receiving 3D graphics data corresponding to one or more intermediate states of the object to be morphed; and
   compressing the 3D graphics data corresponding to the graphical object in the one or more intermediate states into a plurality of additional sub-streams, wherein said merging includes merging the additional sub-streams of data with the first and second sub-streams to form a single stream of compressed graphics data, and wherein the blend information includes weighting information for the additional sub-streams as well as the first and second sub-streams.

59. The method of claim 58, wherein the weighting information is usable to generate blended vertices $B_i$ according to the formula $B_i = P_i^{INITIAL} w_1 + P_i^{FINAL} w_2$, wherein i is an integer representing the number of the vertex, wherein w represents the weighting information applied to each vertex P.

60. A computer software program embodied on a computer-readable medium, wherein the software program comprises a plurality of instructions configured to encode morphing information into compressed three-dimensional (3D) graphics data by:
   reading a first set of 3D graphics data corresponding to an initial state of an object to be morphed;
   reading a second set of 3D graphics data corresponding to a final state of the object to be morphed;
   generating blend information for first and second sets of 3D graphics data;
   compressing the first set of 3D graphics data;
   compressing the second set of 3D graphics data; and
   merging the compressed first and second sets of 3D graphics data and the blending data into a single stream of compressed 3D graphics data.

61. The program as recited in claim 60, wherein the blend information comprises a plurality of pairs of weighting factors, wherein each pair of weighting factors corresponds to a particular frame in a morphing sequence, and wherein each pair comprises a first weighting factor to be applied to the first set of 3D graphics data and a second weighting factor to be applied to the second set of 3D graphics data.

62. The program as recited in claim 60, further comprising delta-encoding the second set of 3D graphics data relative to the first set of graphics data.

63. The program as recited in claim 60, further comprising delta-encoding one or more additional sets of 3D graphics data, wherein the second set of 3D graphics data relative to the first set of graphics data.

64. The program as recited in claim 60, further comprising delta-encoding one or more of the pairs of weighting factors relative to the first pair of weighting factors.

65. The program as recited in claim 60, further comprising delta-delta-encoding one or more of the pairs of weighting factors.

66. A graphics system comprising:
   one or more decompression units each configured to receive and decompress portions of a stream of compressed three-dimensional graphics data into decompressed primitives;
   a graphics processor configured to receive the decompressed primitives from the decompression units; and
   a memory coupled to the graphics processor, wherein the graphics processor is configured to convey the decompressed primitives to the memory, wherein the graphics processor is configured to read a set of related primitives from the memory, wherein the graphics processor is configured to apply weighting factors to each of the primitives in the set of related primitives, and wherein the graphics processor is configured to combine corresponding weighted primitives to form one or more morphed primitives, wherein the morphed primitives are usable to generate an image for display on a display device;
   wherein the weighting factors are generated during run-time based on one or more run-time modifiable variables.

67. A graphics system comprising:
   one or more decompression units each configured to receive and decompress portions of a stream of compressed three-dimensional graphics data into decompressed primitives;
   a graphics processor configured to receive the decompressed primitives from the decompression units; and
   a memory coupled to the graphics processor, wherein the graphics processor is configured to convey the decompressed primitives to the memory, wherein the graphics processor is configured to read a set of related primitives from the memory, wherein the graphics processor is configured to apply weighting factors to each of the primitives in the set of related primitives, and wherein the graphics processor is configured to combine corresponding weighted primitives to form one or more morphed primitives, wherein the morphed primitives are usable to generate an image for display on a display device;
   wherein the weighting factors are procedurely generated based on run-time variables.

68. A graphics system comprising:
   one or more decompression units each configured to receive and decompress portions of a stream of compressed three-dimensional graphics data into decompressed primitives;
   a graphics processor configured to receive the decompressed primitives from the decompression units; and
   a memory coupled to the graphics processor, wherein the graphics processor is configured to convey the decompressed primitives to the memory, wherein the graphics processor is configured to read a set of related primitives from the memory, wherein the graphics processor is configured to apply weighting factors to each of the primitives in the set of related primitives, and wherein the graphics processor is configured to combine corresponding weighted primitives to form one or more morphed primitives, wherein the morphed primitives are usable to generate an image for display on a display device;
   wherein the morphed primitives comprise a plurality of blended vertices, wherein each blended vertex $B_i$ is formed according to the formula $B_i = P_i^1 w_1 + P_i^2 w_2 + P_i^3 w_3 + \ldots$, wherein i is an integer representing a particular vertex number, wherein each $w_{1 \ldots n}$ represents one weighting factor applied to each particular vertex P received from the decompression units.

69. The graphics system of claim 68, wherein the blended vertices $B_i$ comprise blended position information and blended color information.

70. The graphics system of claim 68, wherein the blended vertices $B_i$ comprise blended normal information.

71. The graphics system of claim 70, wherein the blended normal information is blended using different weighting factors than the blended position information and blended color information.

72. The graphics system of claim 70, wherein the blended normal information is blended using a linear function.

73. The graphics system of claim 70, wherein the blended normal information is blended using a non-linear function.

74. A graphics system comprising:
- one or more decompression units each configured to receive and decompress portions of a stream of compressed three-dimensional graphics data into decompressed primitives, wherein the stream of compressed three-dimensional graphics data includes weighting information, wherein the one or more decompression units are configured to extract and convey the weighting information; and
- a graphics processor configured to receive the decompressed primitives from the decompression units; and
- a memory coupled to the graphics processor, wherein the memory stores the decompressed primitives;
- wherein the graphics processor is configured to read a set of related primitives from the memory, wherein the graphics processor is configured to apply the weighting information to each of the primitives in the set of related primitives, and wherein the graphics processor is configured to combine corresponding weighted primitives to form one or more morphed primitives, wherein the morphed primitives are usable to generate an image for display on a display device.

75. A method for morphing graphics data, the method comprising:
- receiving a stream of compressed three-dimensional graphics data, wherein the stream of compressed three-dimensional graphics data includes weighting information;
- decompressing the stream into a plurality of decompressed primitives, wherein said decompressing includes extracting the weighting information;
- storing the decompressed primitives into memory;
- reading a plurality of first primitives from the memory;
- modifying the first primitives based on the weighting information to form weighted primitives;
- summing the weighted primitives to form a morphed primitive; and
- rendering the morphed primitive.

76. The graphics system of claim 75, further comprising normalizing the morphed primitive.

77. The graphics system of claim 75, further comprising repeating said applying for different weighting factors to generate different morphed images.

78. The graphics system of claim 75, wherein said reading is performed in response to detecting that all primitives contributing to a particular morphed primitive have been decompressed.

* * * * *